US011579098B2

(12) United States Patent
Waters et al.

(10) Patent No.: US 11,579,098 B2
(45) Date of Patent: Feb. 14, 2023

(54) METHOD AND APPARATUS FOR DETECTING DEPOSITS IN A PIPE SYSTEM OF AN APPARATUS

(71) Applicant: BASF SE, Ludwigshafen am Rhein (DE)

(72) Inventors: Gerrit Waters, Ludwigshafen am Rhein (DE); Ingolf Hennig, Ludwigshafen am Rhein (DE); Steffen Wagloehner, Ludwigshafen am Rhein (DE); Eric Jenne, Ludwigshafen am Rhein (DE); Heinrich Laib, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 926 days.

(21) Appl. No.: 16/327,049

(22) PCT Filed: Aug. 3, 2017

(86) PCT No.: PCT/EP2017/069645
§ 371 (c)(1),
(2) Date: Feb. 21, 2019

(87) PCT Pub. No.: WO2018/036781
PCT Pub. Date: Mar. 1, 2018

(65) Prior Publication Data
US 2019/0195810 A1 Jun. 27, 2019

(30) Foreign Application Priority Data
Aug. 22, 2016 (EP) ..................................... 16185180

(51) Int. Cl.
*G01N 22/02* (2006.01)
*G01B 15/00* (2006.01)
(Continued)

(52) U.S. Cl.
CPC ............. *G01N 22/02* (2013.01); *G01B 15/00* (2013.01); *G01N 22/00* (2013.01); *G01S 13/42* (2013.01)

(58) Field of Classification Search
CPC ........ G01B 15/00; G01N 22/00; G01N 22/02; G01S 13/42
See application file for complete search history.

(56) References Cited

U.S. PATENT DOCUMENTS 4,423,623 A 1/1984 Ho et al.
4,477,771 A 10/1984 Nagy et al.
(Continued)

FOREIGN PATENT DOCUMENTS

DE 10358495 A1 7/2005
EP 0821431 A2 1/1998
(Continued)

OTHER PUBLICATIONS

Yang Ju, "Remote Measurement of the Pipe Thickness Reduction by Microwaves", Proceedings of PVP2007 2007 ASME Pressure Vessels and Piping Division Conference Jul. 22-26, 2007, San Antonio, Texas (Year: 2007).*

(Continued)

*Primary Examiner* — Regis J Betsch
(74) *Attorney, Agent, or Firm* — Faegre Drinker Biddle & Reath LLP

(57) ABSTRACT

A method for detecting deposits in a pipe system of an apparatus is proposed, the apparatus being flowed through by a fluid. In the method it is provided that at least one microwave probe is introduced into the pipe system in such a way that the fluid flows against a window (102) of the microwave probe that is transparent to microwave radiation, and that microwaves are coupled into the pipe system by way of at least one microwave probe, (Continued)

wherein a reflection measurement is carried out with one or two microwave probes, and/or at least two microwave probes are introduced into the pipe system at a distance from one another and a transmission measurement is carried out, wherein a comparison of measurement data with a reference or a previous measurement is used to deduce a constriction in the pipe system segment and the free cross-section at the constriction is determined, the detection of a constriction being used to deduce the presence of deposits.

Further aspects of the invention relate to a microwave probe for coupling microwave radiation into the pipe system of an apparatus and to a measuring device for carrying out the method that comprises at least one such microwave probe.

15 Claims, 13 Drawing Sheets

(51) Int. Cl.
 *G01N 22/00* (2006.01)
 *G01S 13/42* (2006.01)

(56) References Cited

U.S. PATENT DOCUMENTS

| | | | |
|---|---|---|---|
| 5,334,941 | A | 8/1994 | King |
| 5,455,516 | A | 10/1995 | Jean et al. |
| 5,880,698 | A * | 3/1999 | Burger ............... H01Q 9/42 |
| | | | 343/786 |
| 6,909,669 | B1 | 6/2005 | Yankielun et al. |
| 7,712,381 | B2 * | 5/2010 | Allenberg ............ H01Q 1/38 |
| | | | 73/861.12 |
| 9,310,321 | B1 * | 4/2016 | Johnson ............... G01N 22/02 |
| 2004/0135585 | A1 | 7/2004 | Nagy |
| 2007/0024505 | A1 | 2/2007 | Geisheimer et al. |
| 2008/0164874 | A1 | 7/2008 | White et al. |
| 2010/0156702 | A1 | 6/2010 | Edvardsson |
| 2012/0242532 | A1 | 9/2012 | Fouarge et al. |
| 2015/0123688 | A1 * | 5/2015 | Sappok ............... G01N 22/00 |
| | | | 324/754.31 |
| 2015/0260661 | A1 | 9/2015 | Weber et al. |
| 2015/0316402 | A1 * | 11/2015 | Wee ..................... G01F 1/44 |
| | | | 73/861.04 |
| 2016/0077022 | A1 | 3/2016 | Waglöhner et al. |

FOREIGN PATENT DOCUMENTS

| | | | |
|---|---|---|---|
| EP | 2365302 | A1 | 9/2011 |
| EP | 2561339 | A1 | 2/2013 |
| EP | 2919042 | A1 | 9/2015 |
| GB | 2479741 | A | 10/2011 |
| JP | 07-005123 | A | 1/1995 |
| JP | 10-062361 | A | 3/1998 |
| JP | 3170282 | B2 | 5/2001 |
| JP | 2001-249085 | A | 9/2001 |
| JP | 3400255 | B2 | 4/2003 |
| JP | 2003307502 | A | 10/2003 |
| JP | 2011-043343 | A | 3/2011 |
| RU | 2052796 | C1 | 1/1996 |
| WO | WO-0046545 | A1 * | 8/2000 ............... F17D 3/01 |
| WO | WO-2010074812 | A1 | 7/2010 |
| WO | WO-2011133046 | A1 | 10/2011 |
| WO | WO-2014173889 | A1 | 10/2014 |

OTHER PUBLICATIONS

Keith W. Whites, "Electromagnetic Wave Propagation Through Circular Waveguides Containing Radially Inhomogeneous Lossy Media", AD-A213 062, USACERL Technical Manuscript M-89/11, Sep. 1989 (Year: 1989).*

"Solidflow Microwave Solids Flow Measurement system", GTS Inc., Shalimar, fl (Year: 2013).*

Fischerauer, G., et al., "Sensing the soot load in automotive diesel particulate filters by microwave methods", Measurement Science and Technology, vol. 21, (2010), pp. 1-6.

International Preliminary Report on Patentability for International application No. PCT/EP/2017/069645, dated Feb. 26, 2019.

Nyfors, E. G., "Cylindrical Microwave Resonator Sensors for Measuring Materials Under Flow", Dissertation, Helsinki University of Technology, (2000), pp. 53-54, 85-87, 131-146.

Otoshi, T. Y., "RF Properties of the 64-m-Diameter Antenna Mesh Material as a Function of Frequency", Jet Propulsion Laboratory Technical Report, vol. XII, No. 32-1526, pp. 26-31.

International Search Report for PCT/EP2017/069645 dated Sep. 4, 2017.

Written Opinion of the International Searching Authority for PCT/EP2017/069645 dated Sep. 4, 2017.

* cited by examiner

METHOD AND APPARATUS FOR DETECTING DEPOSITS IN A PIPE SYSTEM OF AN APPARATUS

CROSS-REFERENCE TO RELATED APPLICATIONS

This application is a national stage application (under 35 U.S.C. § 371) of PCT/EP2017/069645, filed Aug. 3, 2017, which claims benefit of European Application No. 16185180.3, filed Aug. 22, 2016, both of which are incorporated herein by reference in their entirety.

The invention relates to a method for detecting deposits in a pipe system of an apparatus in which microwave radiation is coupled into the pipe system. Further aspects of the invention relate to a microwave probe for coupling microwave radiation into the pipe system of an apparatus and to a measuring device for carrying out the method that comprises at least one such microwave probe.

When carrying out many chemical methods and processes, undesired deposits are produced in the apparatuses used. The deposits impair the method or the process being carried out and, depending on the composition and the situation, can represent a safety problem. One example is steam cracking, in which ethylene and propylene are obtained by thermal cracking of longer-chain hydrocarbons, such as for example naphtha or ethane. The method is carried out in a tubular reactor, the tube typically having an inside diameter of 80 mm to 120 mm and a length of 50 m to 200 m. For carrying out the cracking, the tube is heated by way of a furnace. The process proceeds at a temperature of up to 1050° C. under a slightly increased pressure in a range of 2 to 3 bar, the partial pressure of the individual components that take part in the reaction being reduced by adding steam. After the cracking, the gas is abruptly cooled down to a temperature below 300° C. Although the reaction conditions have been steadily optimized by many years of experience, carbonaceous substances are left on the inside walls of the pipes in the form of carbon deposits. These carbon deposits form a solid layer on the inside walls of the pipes and may reach a thickness in the range of several cm. At the same time, the carbon deposits do not occur uniformly over the pipe system but may be distributed unevenly over the pipe, in particular under varying process conditions, for example on account of temperature fluctuations as a result of the design of the furnace.

Carbon deposits in a pipe system are problematic because they not only can lead to blockages but also represent a thermal insulation between the inner pipe wall and the cooler stream conducted in the pipe (especially in the case of an endothermic reaction). Apart from an uneven heat transfer to the stream conducted in the pipe, there may also be local overheating of the pipe, as a result of which the pipe may be damaged. Furthermore, on account of a coefficient of thermal expansion that is different from the pipe, the deposits represent a problem when running the reactor down. Mechanical stresses that damage the pipe may occur during cooling down.

It is therefore customary in the prior art to interrupt the production sequence at preset intervals and remove carbon deposits caused by oxidation. It is problematic in this case that the precise state of the pipe system, and consequently the quantity and position of the carbon deposits in the pipe system, are not known.

Methods by which deposits inside an apparatus can be measured are known in the prior art.

WO 2014/173889 discloses a method and a device for measuring deposits inside an apparatus by using microwave radiation. In this case, a microwave resonator is introduced into the apparatus and a resonant frequency of the microwave resonator is determined. The apparatus may be for example a column, a heat exchanger or a reactor. If the apparatus itself has a diameter that is suitable for use as a microwave resonator, the apparatus itself may also be used as the microwave resonator. For the measurement, microwave radiation is introduced into the resonator and the resonant frequency and/or the quality of a resonance of the microwave resonator is/are determined. Subsequently, a change in the resonant frequency and/or the quality of the resonance is used to deduce the quantity and/or the type of deposits inside the apparatus.

A disadvantage of the method is that either the apparatus itself has to have a geometry that is suitable for use as a microwave resonator or additional microwave resonators have to be introduced into the apparatus. If the apparatus itself is used as the resonator, it is also the case that only figures averaged over the entire volume are obtained, and so it is not possible to deduce the distribution of the deposits in the apparatus.

U.S. Pat. No. 6,909,669 B1 discloses a device and method for detecting scour in sediments. The device comprises a probe, which is at least partially embedded in the sediment. In addition, the device comprises a reflectometer, a power supply and a telemetry transmitter. The probe comprises two parallel tubes, which are introduced into the sediment. The two tubes form a conduit, into which a signal is coupled. The impedance of the conduit is dependent on the material surrounding the conduit. In one embodiment, parts of the signal are reflected at interface boundaries, the runtime being measured. The runtime is a measure of the distance of the interface boundary from the beginning of the conduit. Alternatively, a frequency-modulated signal is coupled in, with the frequency increasing for example from 100 MHz to 1000 MHz. The reflected signal is subsequently mixed with the time-delayed original signal and the differential signal created is evaluated, the frequency of the differential signal being a measure of the distance from the reflective interface boundary.

A disadvantage of the method described is that, for the region covered by the measurements, a defined transmission line is required for the signals used.

Consequently, an object of the invention is to provide a method with which deposits in a pipe system are detected and information about their arrangement in the pipe system is obtained.

A further object of the invention is to provide a microwave probe that is designed for being arranged within a pipe system of an apparatus.

A further object of the invention can be considered that of providing a microwave probe that is designed for coupling to a pipe system of an apparatus.

A method for detecting deposits in a pipe system of an apparatus is proposed, the apparatus being flowed through by a fluid. In the method it is provided that at least one microwave probe is introduced into the pipe system in such a way that the fluid flows against a window of the microwave probe that is transparent to microwave radiation, and that microwaves are coupled into the pipe system by way of the at least one microwave probe through the window which is transparent to microwave radiation, wherein the microwaves coupled into the pipe system propagate in the pipe system in the same way as in a hollow conductor, wherein a.) a reflection measurement is carried out, in which reflections of the microwaves radiated by the at least one microwave probe are received again by the respective microwave probe, cut-off frequencies being determined, wherein for determining the cut-off frequencies of the microwaves coupled into the pipe system, the frequency of the microwaves is varied in a preset region and for each frequency the intensity of the reflected microwave radiation is determined, and a comparison with a reference or a previous measurement being used to deduce a constriction in the surrounding area of the microwave probe, wherein cut-off frequencies indicating constrictions are detected and the free cross-section at the constriction being determined from this constriction indicating cut-off frequency, and/or b.) a reflection measurement is carried out, in which reflections of the microwaves radiated by the at least one microwave probe are received again by the respective microwave probe at a constriction, the distance between the respective microwave probe and the constriction in the pipe system being ascertained by taking account of a signal runtime, and/or c.) at least two microwave probes are introduced into the pipe system at a distance from one another and a transmission measurement between two microwave probes is carried out, the arrangement of the two microwave probes defining a pipe system segment, cut-off frequencies of the pipe system segment being determined, wherein for determining the cut-off frequencies of the microwaves coupled into the pipe system, the frequency of the microwaves is varied in a preset region and for each frequency the intensity of the reflected microwave radiation is determined, and a comparison with a reference or a previous measurement being used to deduce a constriction in the pipe system segment, wherein cut-off frequencies indicating constrictions are detected and the free cross-section at the constriction being determined from this constriction indicating cut-off frequency, wherein the detection of a constriction is used to deduce the presence of deposits.

A constriction may be a local narrowing of the pipe system that is spatially delimited. In this case, the deposits are unevenly distributed in the pipe system. Evenly distributed deposits that extend over a large part of the pipe system or over the entire pipe system and homogeneously reduce the diameter of the pipe system are also regarded as a constriction.

In the method it is envisaged to couple microwave radiation into the pipe system to be investigated. The pipe system comprises a pipe or a number of pipes, usually of a circular cross-section, of an electrically conductive material, so that they approximately represent a hollow conductor of a circular cross-section. In a hollow conductor, electromagnetic waves, such as for example microwaves, can propagate with only little damping. However, the geometrical dimensions of the hollow conductor have the effect of presetting a cut-off frequency. Electromagnetic waves with a frequency below this cut-off frequency cannot propagate in the hollow conductor.

In the hollow conductor, electromagnetic waves with various oscillation modes can propagate, the cut-off frequency for each of the oscillation modes being different. In the case of TM (transverse magnetic) oscillation modes, the magnetic field disappears in the direction of propagation of the wave, and so only the electrical field has a component in the direction of propagation. Conversely, in the case of TE (transverse electric) oscillation modes, the electrical field disappears in the direction of propagation, and so only the magnetic field has a component in the direction of propagation. The oscillation modes are also identified by two indices, for oscillation modes of a hollow conductor of a circular cross-section the first index giving the number of periods of the field in the circumferential direction and the second index giving the number of zero points of the field in the radial direction. The oscillation modes $TM_{01}$ and $TE_{11}$ have the lowest cut-off frequencies for circular hollow conductors and are used with preference for the proposed method.

A microwave probe is used for coupling in the microwave radiation. Inside, this probe comprises an antenna, by way of which the oscillation modes can be excited in the surrounding area of the microwave probe. For protection from the ambient conditions inside the pipe system of the apparatus, the antenna is covered, the microwaves passing through a window that is transparent to microwave radiation into the pipe system.

If the pipe system has at least one curved section, for example a 90° bend, it is preferred to introduce the microwave probe into the pipe system at the curved section. Within the curved section a differing geometry is present compared to straight sections of the pipe system. It has been found here that the TE11 mode with a low cut-off frequency is preferably excited here as a result of the geometrically different surrounding area of the microwave probe.

Since the deposits that are intended to be detected by the proposed method are often carbonaceous, such as for example carbon deposits in a steam cracker, the deposits expected inside the pipe system are usually electrically conductive. However, electrically conductive materials shield microwave radiation, and so the window of the microwave probe must not become completely covered by the deposits.

It has surprisingly been found in this respect that, when it flows against the microwave probe, the fluid stream conducted in the apparatus can prevent the occurrence of deposits on the window of the microwave probe. For this purpose, the microwave probe is inserted into the pipe system in such a way that the fluid flows directly against the window. In the case of a steam cracker, the fluid stream is for example the cracking gas. Preferably, particles are entrained in the fluid, the impinging particles reliably freeing the window of deposits. This works in a way similar to the cleaning of surfaces by sandblasting.

In this case it is not required for the function of the microwave probe that the entire surface of the window is subjected to the flow and thereby kept free of deposits. In the case of a window in the form of a rod-shaped casing, the microwave probe is preferably introduced in such a way that the longitudinal side of the casing is subjected to the flow. In the case of a planar window or a conically shaped window, the microwave probe is preferably introduced in such a way that the window is subjected to the flow perpendicularly to the plane or to the longitudinal axis.

The particles entrained with the fluid may be produced in the process that is carried out in the apparatus. For example, the particles are carbon particles or carbon black particles produced during steam cracking. These particles have a hardness comparable to that of the deposits or carbon deposits produced, and so the particles act abrasively. Alternatively or in addition, it is conceivable to add to the fluid particles with a hardness that is comparable to or greater than the deposits.

The microwaves coupled into the pipe system by the microwave probe propagate in the pipe system in the same way as in a hollow conductor. For detecting the deposits, the microwaves may be received again by way of a second microwave probe, which is arranged at another location in the pipe system. Such a measurement is referred to as transmission measurement. Alternatively or in addition, reflected microwaves may be received again by way of the same microwave probe that coupled them into the pipe system. Such a measurement is referred to as reflection measurement.

The pipe system of a typical apparatus, such as for example a steam cracker, comprises discontinuities, such as branches, bends, manifolds, connections and changes in the pipe cross-section. Every change to the pipe that represents a deviation from the hollow conductor with a circular cross-section of constant diameter acts on the microwave radiation like a disturbance, and so at these locations the electromagnetic oscillation is damped and part of the radiation coupled in is reflected. It has surprisingly been found that, in spite of the large number of these discontinuities in a typical pipe system, the detection of deposits is possible with the aid of a microwave-based measurement.

According to feature a), a reflection measurement, in which reflections of the microwaves radiated by a microwave probe are received again by the same microwave probe, is carried out. In this case it is envisaged to determine cut-off frequencies. A cut-off frequency is characteristic of the smallest free pipe cross-section of discontinuities in a surrounding area around the microwave probe. The surrounding area is in this case provided by the region of the pipe system from which reflections of the microwave radiation can be detected and evaluated. The more sensitive the measuring technique used, or the greater the intensity of the microwave radiation coupled in, the greater the surrounding area from which reflections can still be received, and correspondingly the greater a region of the pipe system that can be monitored. For determining the cut-off frequencies, the frequency of the microwaves radiated by the microwave probe in a preset region is varied and for each frequency the intensity of the reflected microwave radiation is determined.

For the diameters that are used in the case of typical pipe systems, in the range of 80 mm to 120 mm, the cut-off frequency for the $TE_{11}$ oscillation mode lies in the range of 1.6 GHz to 2.4 GHz. In the case of a constriction caused by deposits, in the region of the constriction there is a cut-off frequency that is higher in accordance with the degree of the constriction. It is therefore preferred to choose the lower limit for the variation of the microwave frequency in the region of the lowest cut-off frequency for the pipe that is free from deposits. The upper limit can be chosen in accordance with the thickness of the expected deposits, the upper limit often being determined by the measuring technique that is used. For example, the frequency is varied in a range of 300 kHz to 20 GHz, preferably in the range of 1 to 10 GHz and particularly preferably in the range of 1.5 to 4 GHz.

For generating the microwaves, receiving the microwaves and subsequently evaluating the measurement, a vectorial network analyzer (VNA) may be used. A network analyzer comprises a controllable microwave generator, a receiver and necessary electronics, such as for example amplifiers and analog/digital converters for the evaluation of the measurement. It is however also possible to use the respective component parts in the form of individual units.

If the intensity of the reflected microwave radiation is plotted against the frequency, a cut-off frequency can be detected in the form of a change in the intensity. Even in the case of a simple pipe without branches it is possible to ascertain a number of cut-off frequencies that are attributable to the geometrical dimensions of the hollow conductor that is formed by the pipe for the various oscillation modes. Further detected frequencies indicate constrictions in the pipe or the pipe system and are caused by deposits, such as for example carbon deposits. Since the cut-off frequency is dependent on the geometrical dimensions of the hollow conductor, in this way the free diameter of the pipe at this constriction can be determined from the ascertained cut-off frequency.

For detecting a constriction in a complex pipe system of an apparatus, it is envisaged to compare the measurement results of the reflection measurement with a reference or a previous measurement. This involves in particular comparing all of the cut-off frequencies ascertained in the measurement with the cut-off frequencies that the reference or the previous measurement comprises. An ascertained cut-off frequency that the reference or the previous measurement does not comprise is an indication here of a constriction that is caused by deposits. It is consequently deduced from this that deposits are present. The free pipe cross-section at this constriction is then calculated from this cut-off frequency.

Alternatively or in addition, according to feature b), a reflection measurement, in which reflections of the microwaves radiated by a microwave probe are received by the same microwave probe again, is carried out. In this case it is envisaged to determine the signal runtime of a reflected microwave signal. Every discontinuity, such as for example branches, bends, manifolds, connections and changes to the pipe cross-section, changes the properties of the pipe system serving as a hollow conductor, part of the microwave signal being reflected at every change. Each reflection received thus represents an indication of a discontinuity in the surrounding area of the microwave probe. The distance of the discontinuity from the microwave probe is in this case given by half the ascertained signal runtime multiplied by the propagation rate of the microwaves in the pipe system.

For this runtime measurement, a signal is radiated by the microwave probe and reflections of this signal are received again by the same microwave probe and evaluated. In time domain reflectometry (TDR), the radiated signal is a time-limited pulse that is generated by a pulse generator, and its response signal is measured by a wideband oscilloscope. Alternatively, with a network analyzer (VNA) for example, a continuous monochromatic microwave signal may be coupled in by way of the microwave probe, and so a microwave resonance field is generated, the intensity of the microwave resonance field being determined by way of the microwave probe. For this purpose, the amplitude and phase are determined. Subsequently, the frequency of the continuous monochromatic microwave signal is varied and the intensity is measured once again. The operation is repeated for a large number of frequencies from a preset frequency range. In this way, the reaction of the pipe system in the preset frequency range is determined. Subsequently, the intensities of respective frequencies are transformed from the frequency domain into the time domain by means of an inverse Fourier transform. After the transformation into the time domain, the measurement is in the form of a measured time domain amplitude against time (TD spectrum). By this method, the response of the pipe system to a time-limited microwave pulse is calculated.

The measuring method with frequency variation of a continuous monochromatic microwave signal has a better signal-to-noise ratio, and consequently a greater dynamic range, in comparison with the TDR measuring method. Consequently, even signals with a low intensity can still be measured.

Local maxima in the TD spectrum or in the runtime measurement indicate a discontinuity. The distance of the discontinuity from the antenna in this case corresponds to half the time value at which the local maximum occurs, multiplied by the propagation rate of the microwave in the pipe system. A discontinuity generally characterizes the beginning or the end of a constriction of the pipe system.

It is preferred to choose the lower limit for the frequency range that is preset for the measurement in the region of the lowest cut-off frequency for the pipe system free of deposits. The upper limit may be chosen to correspond to the thickness of the expected deposits, the upper limit often being determined by the measuring technique that is used. For example, the frequency is varied in a range of 300 kHz to 20 GHz, preferably in the range of 1 to 10 GHz and particularly preferably in the range of 1.5 to 4 GHz.

The ascertained discontinuities are compared with a reference or with a previous measurement. This involves in particular comparing the distances of the ascertained discontinuities from the microwave probe with the distances of the discontinuities that the reference or the previous measurement comprises. A discontinuity that is not known in the reference or in the previous measurement indicates newly created deposits. The distance of the deposit from the microwave probe corresponds to the specific distance of the corresponding discontinuity from the microwave probe. On the basis of the known position of the microwave probe in the pipe system, the position of the deposit in the pipe system can also be determined from the distance of the discontinuity or the detected deposit from the microwave probe.

In a measurement according to feature b), it is also possible for a number of microwave probes to be introduced into the pipe system at a distance from one another. For example, two microwave probes are introduced into the pipe system at a distance from one another and the reflection measurement is carried out from two sides of a pipe system segment defined by the two microwave probes. As compared with a measurement with only one microwave probe, it is additionally possible in this case to determine from the ascertained distances of a constriction from the two microwave probes and the known length of the pipe system segment the length of the constriction or, in the case of two constrictions, the distance from one another.

Alternatively or in addition, according to feature c), a transmission measurement, in which microwaves are introduced into the pipe system by a first microwave probe and are received again by a second microwave probe, may also be carried out. In the case of this measurement, a pipe system segment that lies between the two microwave probes introduced into the pipe system is investigated.

The basic sequence of the measurement corresponds to the reflection measurement described with reference to feature a), the microwaves being coupled into the pipe system by the first microwave probe and received by the second microwave probe.

For detecting a constriction in a complex pipe system of an apparatus, it is envisaged to compare the measurement results of the transmission measurement with a reference or a previous measurement. This involves in particular comparing all of the cut-off frequencies ascertained in the measurement with the cut-off frequencies that the reference or the previous measurement comprises. An ascertained cut-off frequency that the reference or the previous measurement does not comprise indicates here a constriction in the pipe system segment that is caused by deposits. It is consequently deduced from this that there are deposits. The free pipe cross-section at the constriction is then calculated from this cut-off frequency.

In addition to detecting a constriction by determining the cut-off frequencies, it may be envisaged to determine the amplitude of the transmitted microwave signal. This amplitude can be compared with a reference or a previous measurement. A change in the amplitude, in particular a reduction in the amplitude, may indicate the presence of a new constriction that is caused by deposits.

The measurements according to features a, b and c may be used individually or else in any desired combinations of variants a, b and c.

Preferably, the measurements are carried out continuously during the operation of the apparatus, a change over time of the measured parameters being determined. It is in this case provided that the operating conditions of the apparatus are varied, a speeding up of the change over time being taken to mean unfavorable operating conditions and a slowing down of the change over time being taken to mean favorable operating conditions. In this way, the operating parameters of the apparatus can be continuously optimized in such a way that the occurrence of deposits is minimized.

It is advantageously possible here to optimize parameters that influence certain spatial regions of the pipe system. If for example the pipe system is heated at a number of points, the known positions of the microwave probes and the ascertained distances of the deposits from the microwave probes can be used to assign the deposits to the individual heated points. If deposits occur to an increased extent at one or more points due to excessive temperatures, the heating of these critical points can be optimized in a specific manner. It is consequently preferred to use the determined positions of detected deposits for optimizing process parameters.

The measurement by the proposed method can be performed continuously, at least one microwave probe remaining inserted in the apparatus during the entire duration of the measurement. Alternatively, it is possible to carry out the method discontinuously, the at least one microwave probe only being inserted for the recording of a measuring point, subsequently removed again and only reintroduced into the apparatus for the next measurement.

The reference values used for a comparison of the measured values may be obtained on the basis of a reference measurement on the pipe system as long as it is still free from deposits. A further possibility for ascertaining the reference values is to ascertain them on the basis of a model. This model may be for example a computer model or a reduced scale model of the pipe system. The microwave probes may in this case be arranged on the scaled-down model in the same way as they are later arranged on the pipe system of the apparatus, and the reference values determined. In a further step, the reference values obtained on the scaled-down model are scaled up to the size of the apparatus.

If the pipe system of the apparatus has connecting points, for example in the form of flanges, at which two parts of the pipe system are joined together, it may happen that at this connecting point microwave radiation can escape from the pipe system serving as a hollow conductor. This escaping microwave radiation may possibly be coupled again into the pipe system by way of further connecting points and falsify the measurement. It is therefore preferably provided that shielding is arranged at connecting points of the pipe system.

This shielding is preferably an electrically conductive material, for example a metal sheet, which electrically seals off the connecting point.

The apparatus is preferably a steam cracker,

A further aspect of the invention is to provide a microwave probe that is suitable for use in the methods described. Preferably, the microwave probe is designed for use in one of the methods described, so that the method features apply correspondingly to the microwave probe and, conversely, the features of the microwave probe apply correspondingly to the methods. Microwave probes that are introduced into the apparatuses to be investigated are often exposed there to increased temperatures in the range of 800 to 1350° C. Moreover, corrosive substances and abrasive media that can attack the microwave probes are often used in the apparatuses.

A microwave probe for coupling microwaves into a pipe system of an apparatus is proposed. The microwave probe comprises a microwave antenna, a window of a material that is transparent to microwave radiation, a coaxial cable that is connected to the microwave antenna and a sleeve. It is also provided that a) the microwave antenna consists of a temperature-resistant metal alloy, preferably a nickel-based alloy, that the coaxial cable comprises a temperature-resistant metal alloy and an inorganic dielectric and that the window is designed as a casing that surrounds the microwave antenna, wherein the sleeve is configured such that the sleeve adjoins the pipe system on the outside and wherein the window designed as a casing goes over on the side facing the coaxial cable into a protective tube, which is connected to the sleeve by way of a length-compensating element, the sleeve at least partially surrounding the protective tube, or b) the sleeve consists of an electrically conductive material and is configured as hollow conductor, the inside diameter of the sleeve corresponding to the inside diameter of the pipe system, the sleeve having on a first side an opening in the direction of the pipe system, the microwave antenna, which is covered by a casing transparent to microwave radiation and extends into the interior of the sleeve, being arranged on the second, opposite side, and the window being designed as a displacer which is of a material that is temperature-resistant and transparent to microwave radiation and takes up the remaining space inside the sleeve. Optionally, the displacer may comprise on the side facing the opening a cap of a material that is likewise transparent to microwave radiation.

In the case of customary microwave probes, the lack of temperature resistance is problematic in particular. On account of high temperatures and corrosive ambient conditions, the material of the antennas that are used is impaired, and so the electrical properties also change. As a result, the impedance is in turn changed, and so the coupling of the microwave radiation is impaired. In particular, it is problematic here that these processes are ongoing, and so the properties of the customary microwave probes are constantly changing and a reliable application of the described methods is not possible. The usual coaxial cables that are used for the connection of the antenna are also not suitable for use at increased temperature. It is consequently required to design the microwave probe in such a way that its critical components, in particular the antenna and the coaxial cable, withstand the conditions inside the pipe system or that their critical components are isolated from the high temperatures and corrosive ambient conditions.

The term temperature resistance is understood to mean that the respective material may be used at least up to a predetermined temperature and is therefore heat-resistant. Preferably, the respective material is resistant and therefore usable up to a temperature of at least 800° C., more preferably up to a temperature of at least 1000° C., particular preferred up to a temperature of at least 1200° C. and most preferably up to a temperature of at least 1400° C.

According to variant a), it is envisaged to design the critical components of the microwave probe, in particular the antenna and the coaxial cable, as temperature-resistant and corrosion-resistant. This allows the microwave probe to be introduced into the pipe system of an apparatus in which high temperatures can occur. For this purpose, it is envisaged to produce the antenna from a temperature-resistant metal alloy. Suitable alloys comprise for example nickel-based alloys, such as for example Inconel 600. It should be noted that high-temperature-resistant alloys have this temperature resistance property because firmly adhering oxide films (for example chromium oxides) have a passivating effect. The presence of such covering layers influences the effective electrical conductivity of the material and may lead to a significant damping of the microwaves. Therefore, the antennas used are preferably inertized with an inert gas.

The microwave antenna is preferably designed as a pin antenna, the length being chosen in the range of d/10 to d. d denotes here the inside diameter of the pipe system. It is particularly preferred for the length of the pin to be chosen in the range of d/6 to d/2. A length of the pin of d/4 to d/2 is most particularly preferred. Microwave antennas designed as pins are distinguished by a particularly great dimensional stability. The great dimensional stability has the effect that the behavior of the microwave antenna is constant over a long period of time and the measurements carried out with the antenna can be reproduced well.

Further preferred designs of the microwave antenna are loop antennas for inductive coupling or horn antennas.

The antenna is connected to a coaxial cable, which comprises an inorganic dielectric, such as for example alumina ($Al_2O_3$) or silica ($SiO_2$). The inner conductor and the outer conductor are preferably designed to be corrosion-resistant. The material of the inner conductor and the material of the outer conductor are preferably selected from a temperature-resistant metal alloy, with preference a nickel-based alloys such as for example Inconel 600. The choice of corrosion-resistant materials for the conductors and the choice of an inorganic dielectric means that the coaxial cable is designed to retain its functional capability even at increased temperatures. The proposed coaxial cables are still capable of functioning even at temperatures in excess of 1000° C. For the example of a coaxial cable of Inconel 600 with an $Al_2O_3$ dielectric at 1000° C. and 8 GHz, the cable damping is around 30 dB/1.5 m.

The casing that surrounds the microwave antenna and represents the window goes over on the side facing the coaxial cable into a protective tube, which is connected to the sleeve by way of a length-compensating element. The sleeve is in this case arranged in such a way that it at least partially surrounds the protective tube. By contrast, the window of the microwave probe is not surrounded by the sleeve. The transition between the window and the protective tube may take place at the point at which the coaxial cable is connected to the antenna. Alternatively, the connection between the coaxial cable and the antenna may also be accommodated in the region of the window.

Connectors that are intended for the insertion of temperature measuring probes are preferably used for the connection to the pipe system. In this case, the microwave probe is inserted instead of a temperature probe, the casing that serves as a window in this case entering the interior of the pipe system together with the microwave antenna surrounded by the casing. It is therefore preferably provided that the diameter of the casing corresponds to the diameter of a temperature measuring probe. The diameter is preferably chosen in the range of 20 to 30 mm. The sleeve of the microwave probe is not in this case introduced into the interior of the pipe system, but adjoins the pipe system on the outside. For this purpose, a flange that is secured to a counterpart on the pipe system may be provided for example on the sleeve. In the case of high temperatures, such as inside a combustion chamber surrounding the pipe system, the sleeve may alternatively be welded directly to the pipe system.

To allow for a change in length as a result of a change in temperature of the casing or the protective tube, it is envisaged to secure the protective tube to the sleeve by way of a length-compensating element. Moreover, in the lead-through of the casing into the pipe system, a loose fit may be provided as a sliding bearing, which in the event of a change in length allows a movement of the casing in the longitudinal direction in relation to the pipe system. However, the sliding bearing is in contact with the interior of the pipe system, and so deposits occurring at this location may impair the function of the sliding bearing. The length-compensating element has the effect of avoiding the occurrence of mechanical stresses that could lead to the casing being damaged. The length-compensating element is in this case preferably isolated from the interior of the pipe system, and so it cannot be impaired in its function by deposits from the pipe system.

The microwave probe may preferably additionally comprise a temperature sensor. In this case, the function of the temperature measurement is retained when an already present temperature measuring probe is replaced by the proposed microwave probe.

According to variant b), it is envisaged to provide a thermal separation, the critical components of the microwave probe being arranged in a region of reduced temperature. When coupled to a pipe system, the critical components are thermally separated from the pipe system, and consequently from the high temperatures occurring in the pipe system.

The sleeve consists here of an electrically conductive material and has an inside diameter that corresponds to the inside diameter of the pipe system. If the pipe system has varying diameters, the inside diameter of the sleeve corresponds to the diameter of the pipe system at the point at which the microwave probe is introduced into the pipe system. Such a design of the sleeve has the effect that, in the same way as the pipe system, it acts as a hollow conductor for microwaves. The sleeve has on its first side an opening that is designed for the connection to the pipe system.

The microwave antenna is arranged on the opposite side and extends into the interior of the sleeve, and so the sleeve completely or at least partially surrounds the casing and the microwave antenna. The remaining space inside the sleeve is filled with a displacer. This is intended to prevent condensable substances from passing from the pipe system into the cooler region located outside the heating system and condensing out there. The displacer also serves as a window that is transparent to microwave radiation. The window must be abrasion-resistant to the possibly particle-charged flow in the pipe system. For this purpose, the displacer is preferably produced from a material that is abrasion-resistant to the particles in the fluid stream. Alternatively or in addition, the displacer may comprise a cap of a material that is abrasion-resistant to the particles in the fluid stream, the material of the cap likewise being transparent to the microwave radiation. In this case, the displacer may be made from a less abrasion-resistant, cheaper material.

The microwave antenna is preferably designed as a pin antenna, the length being chosen in the range of d/10 to d. d denotes here the inside diameter of the pipe system. It is particularly preferred for the length of the pin to be chosen in the range of d/6 to d/2. A length of the pin of d/4 to d/2 is most particularly preferred. Microwave antennas designed as pins are distinguished by particularly great dimensional stability. The great dimensional stability has the effect that the behavior of the microwave antenna is constant over a long period of time and the measurements carried out with the antenna can be reproduced well.

Further preferred designs of the microwave antenna are loop antennas for inductive coupling and horn antennas.

The displacer isolates the microwave antenna, and so the microwave antenna is protected from high temperatures inside the pipe system and from corrosive substances. A connection of the antenna for a coaxial cable is located outside the displacer on the side that is facing away from the opening to the space inside the pipe system, and so neither high temperatures nor corrosive substances can act on the connection or on a coaxial cable that is used. Therefore, in this design variant a customary coaxial cable may be used for the connection to the microwave antenna. It is likewise not required for a temperature-resistant material to be used for the microwave antenna. It is however possible nevertheless to use the alloys described in connection with variant a) for the microwave antenna. Similarly, one of the temperature-resistant coaxial cables described in connection with variant a) may be used.

The displacer is composed of a material that is temperature-resistant and transparent to the microwave radiation. Temperature-resistant cement and fireclay are suitable in particular as materials.

The side of the window that is facing the opening preferably has a conical form or the form of a wedge. In the case of a conical form, it is provided that the microwave probe is introduced into the pipe system in such a way that the fluid flows against the window along its longitudinal axis, along which the form tapers conically. The fluid consequently impinges on the conical tip of the window. In the case of the form of a wedge, it is provided that the fluid impinges on the sloping surface that is formed by the wedge. In the case where the material of the displacer is sufficiently abrasion-resistant, it can be designed directly with a conical tip and there is no need for an additional covering. If the displacer is not sufficiently abrasion-resistant, the cap that is used preferably has a conical form or the form of a wedge.

A flange that can be secured to a corresponding flange of the pipe system is provided for example for the connection to the pipe system. The flange is preferably arranged on the side of the sleeve that is designed for the connection to the pipe system. Alternatively, the sleeve is for example securely connected to the pipe system by means of welding. If the pipe system is in a hot surrounding area, for example in a combustion chamber, the length of the sleeve is preferably chosen to be great enough that the sleeve protrudes out of the combustion chamber.

Both in the case of the embodiment according to variant a) and in the case of the embodiment according to variant b) it is preferably provided that a distance between the microwave antenna and the casing, seen in the direction of the longitudinal axis of the microwave antenna, is at least 20 mm. Particularly preferably, the distance is in the range of 20 to 80 mm and most particularly preferably of 20 to 40 mm. If the microwave antenna is designed as a pin antenna, the distance is measured from the tip of the microwave antenna.

Even if the window is produced from a material that is transparent to microwaves, the window represents a transition from one medium to another medium at which part of the microwave radiation is reflected. The provision of a distance between the casing and the microwave antenna has the effect of achieving an improvement in the quality of the runtime measurements (time domain signals).

Materials that are temperature-resistant, have a low electrical conductivity even at high temperatures and do not have an open porosity are suitable as the material for the window according to variant a) and also for variant b). Temperature-resistant ceramics are suitable in particular. Suitable ceramic materials comprise in particular $\alpha\text{-}Al_2O_3$ without open porosity. In the case of variant b), a cap made of the ceramic material is preferably used.

The connecting of the window to the protective tube of variant a) may be performed for example by adhesive bonding or soldering/brazing. Suitable adhesives include Panacol Cerastil V-336 and Thermeez Hi Seal 7030.

The connecting of the cap to the displacer according to variant b) may be performed for example by adhesive bonding with the adhesives mentioned for variant a).

In the case of variant b), the casing may likewise consist of a ceramic, it being possible in particular for the same ceramic as for the window to be used.

Both in the case of variant a) and in the case of variant b), the region between the microwave antenna and the casing surrounding it may be filled with an inert gas. Nitrogen or argon is suitable for example as the inert gas. Use of the inert gas has the effect that the temperature stability of the microwave antenna is further improved. This is because, even with the use of temperature-resistant nickel-based alloys such as Inconel 600 for the microwave antenna, it has been found that a chromium oxide film ($Cr_2O_3$) forms at high temperatures in an oxygen-containing atmosphere. As a result, the electrical properties of the material are changed, as a result of which in turn the properties of the microwave antenna that consists of this material are changed. Since this change takes place gradually, it becomes more difficult for the measurements to be compared. The provision of the inert gas in the space between the casing and the microwave antenna has the effect that the formation of such a chromium oxide film is prevented and the stability of the microwave antenna is improved.

A further aspect of the invention is the provision of a measuring system that comprises at least one of the microwave probes described and is designed for carrying out one of the methods described. The features described in relation to the methods or the microwave probes therefore apply correspondingly to the measuring system. The measuring system preferably comprises a network analyzer, which is connected to the at least one microwave probe by way of cables. The network analyzer comprises at least one microwave generator and at least one microwave receiver.

The invention is described in more detail below on the basis of the drawings, in which.

Figure 3:
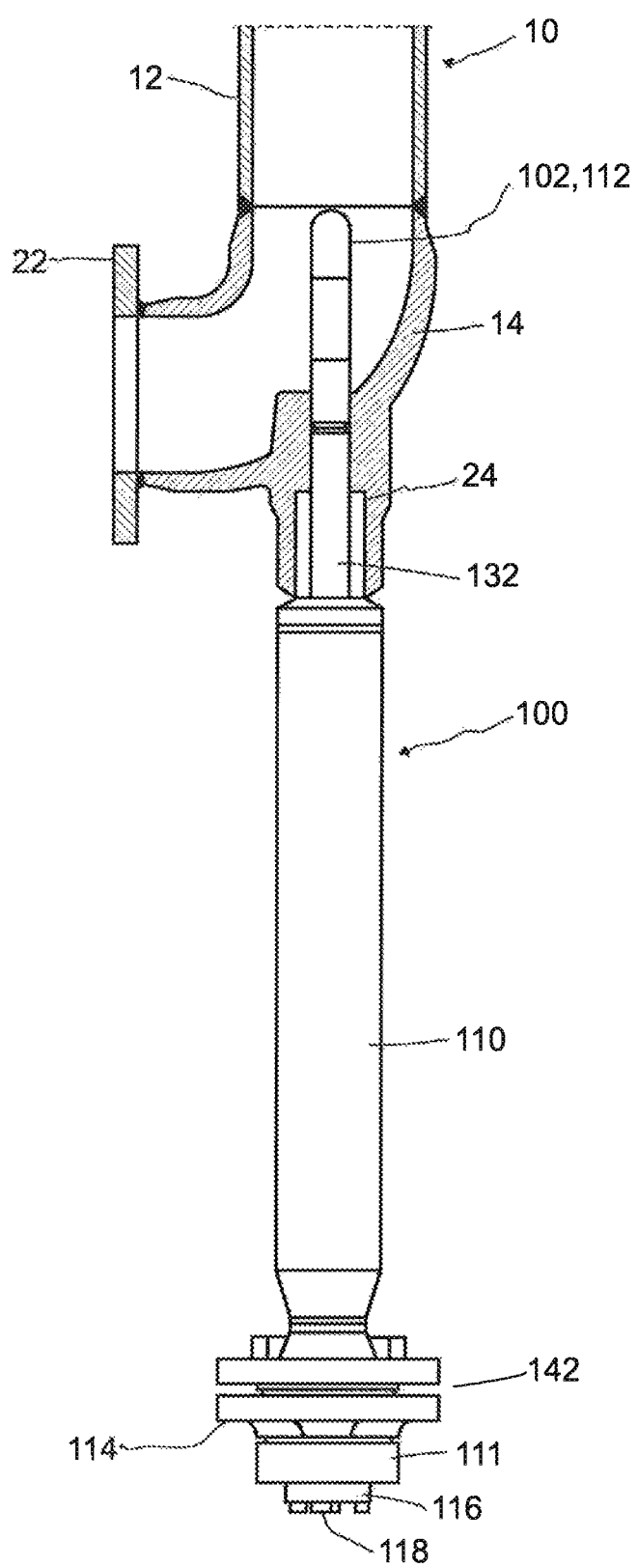
Figure 4:
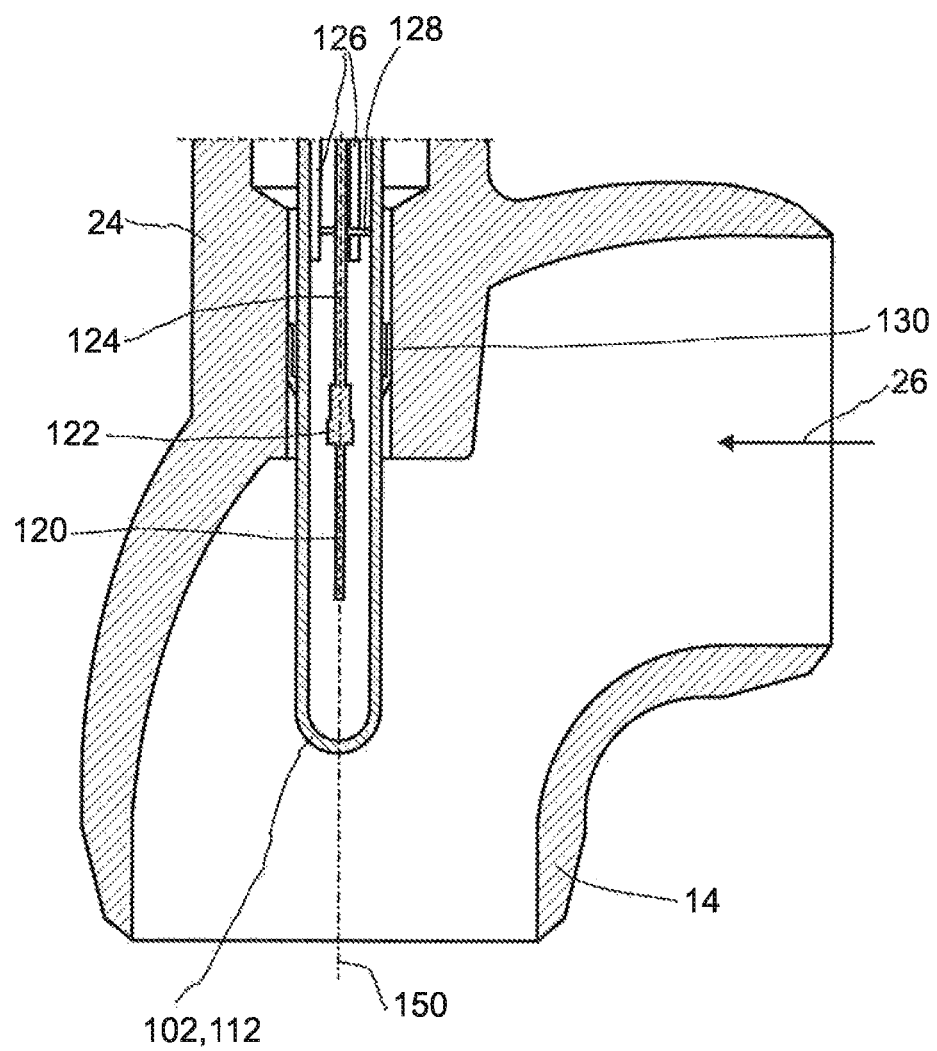
Figure 5:
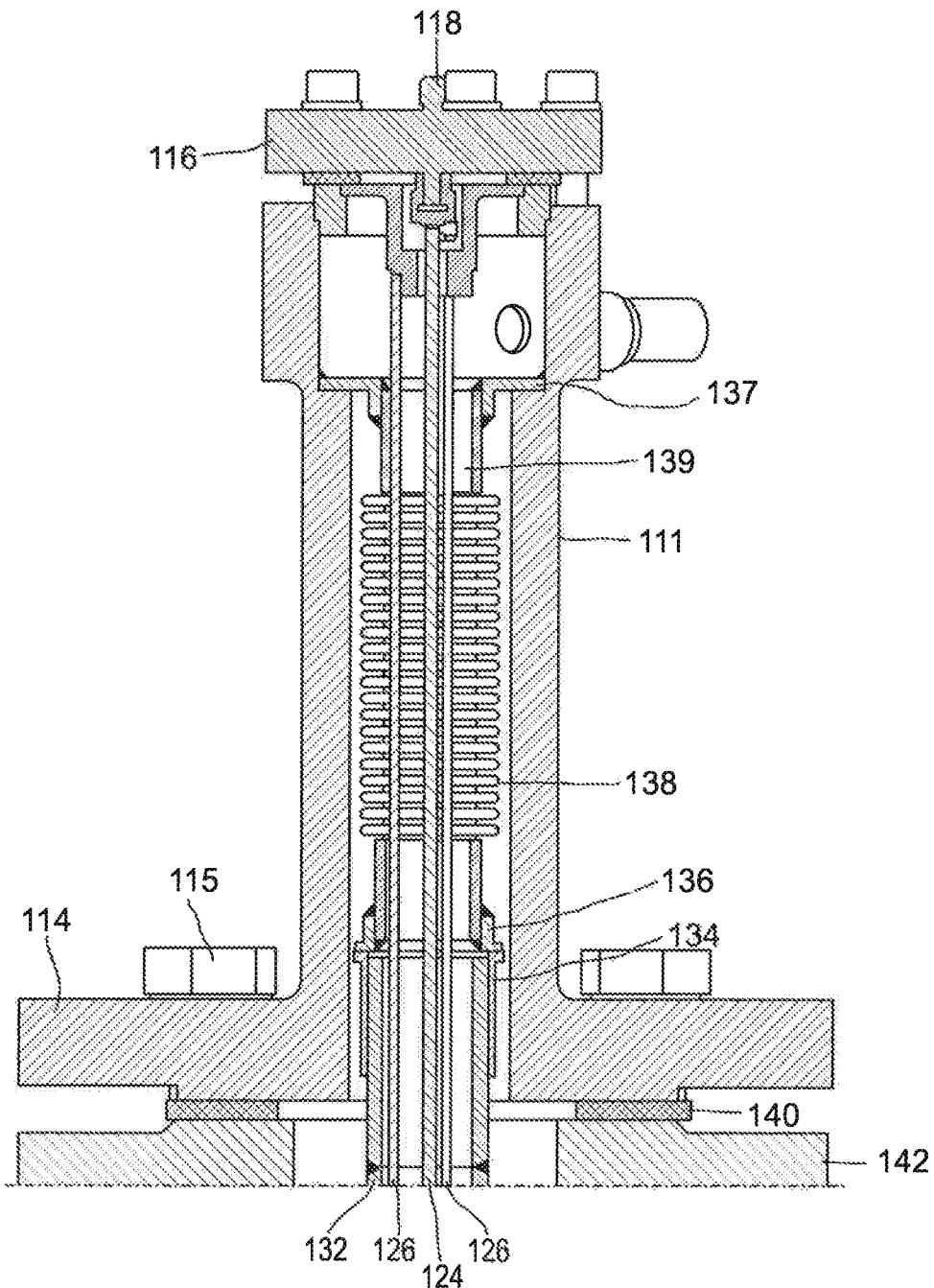
Figure 6:
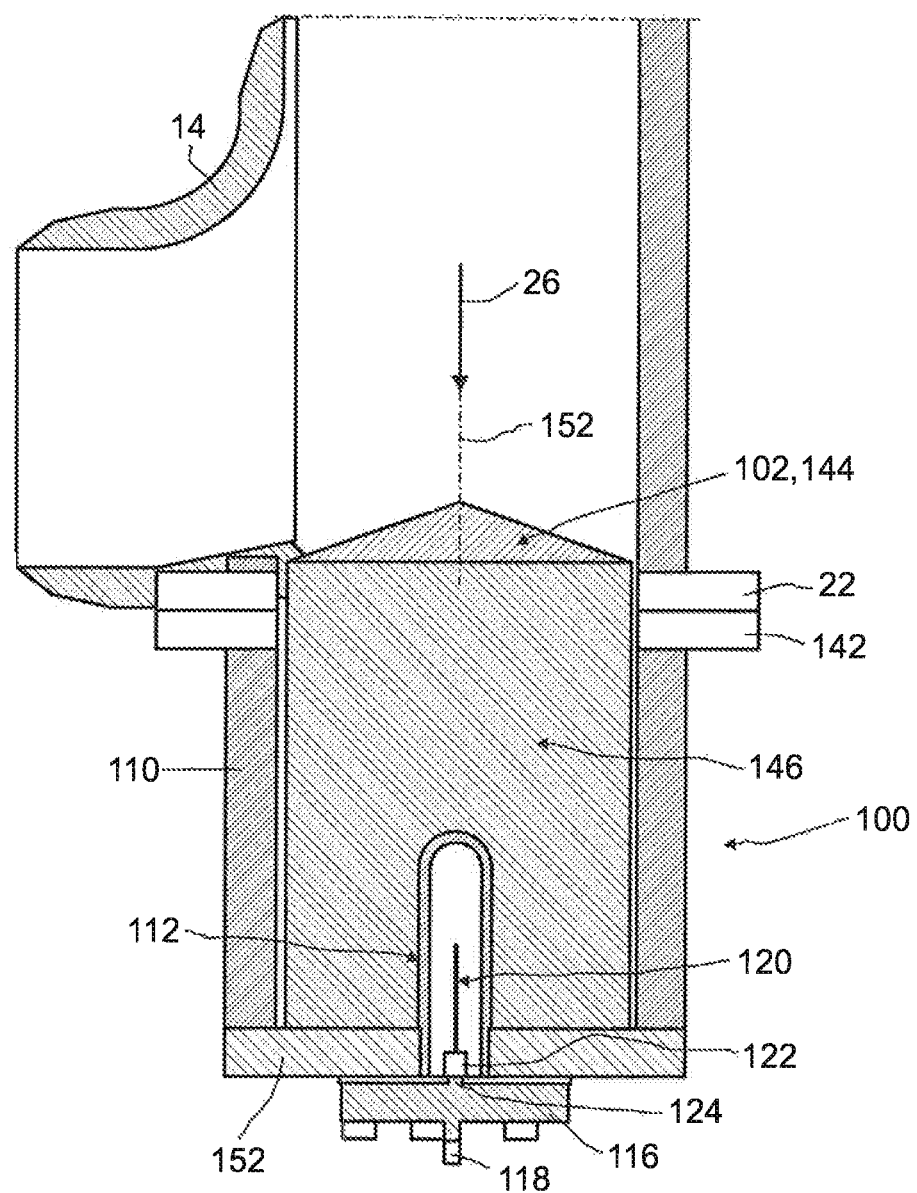
Figure 7A:
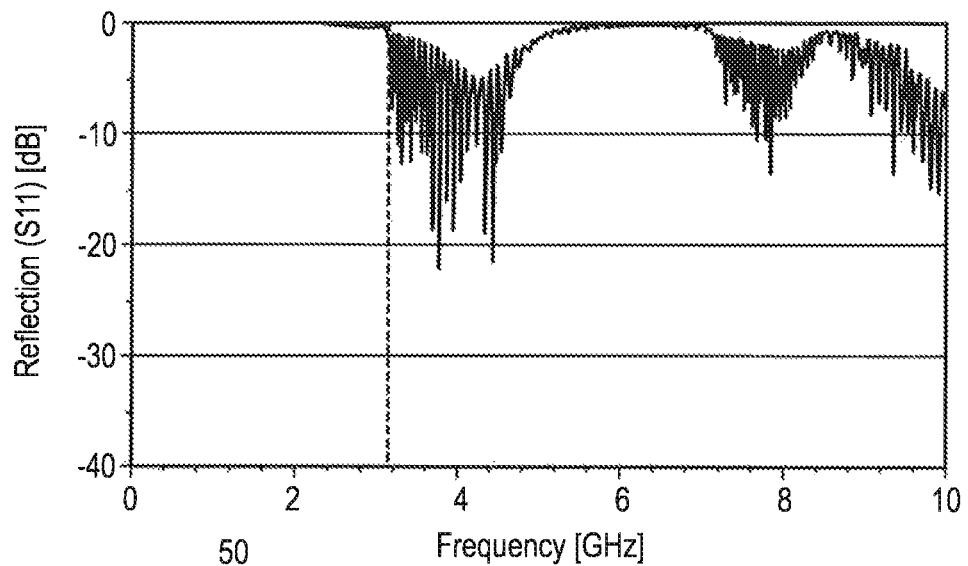
Figure 7B:
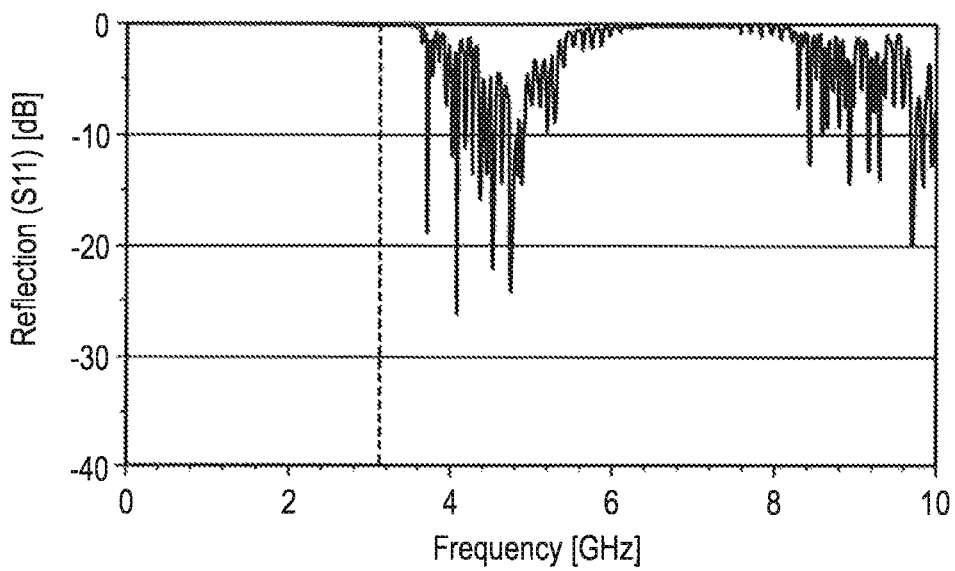
Figure 7B:
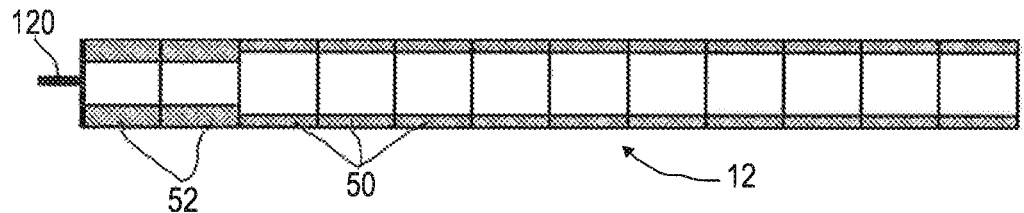
Figure 7C:
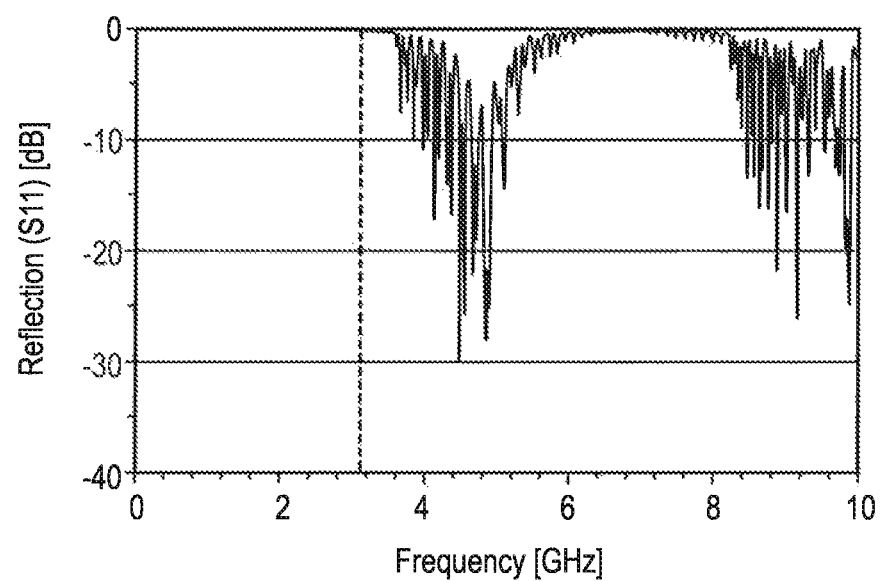
Figure 7C:
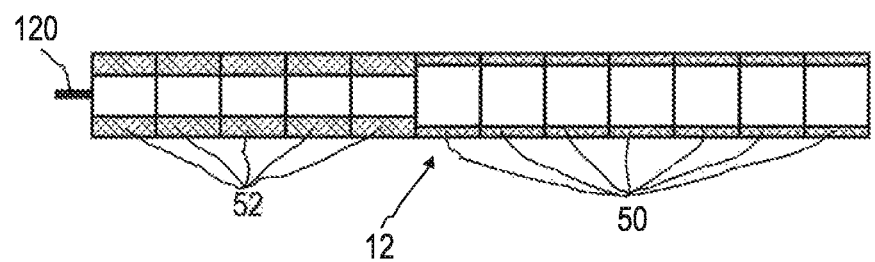
Figure 8A:
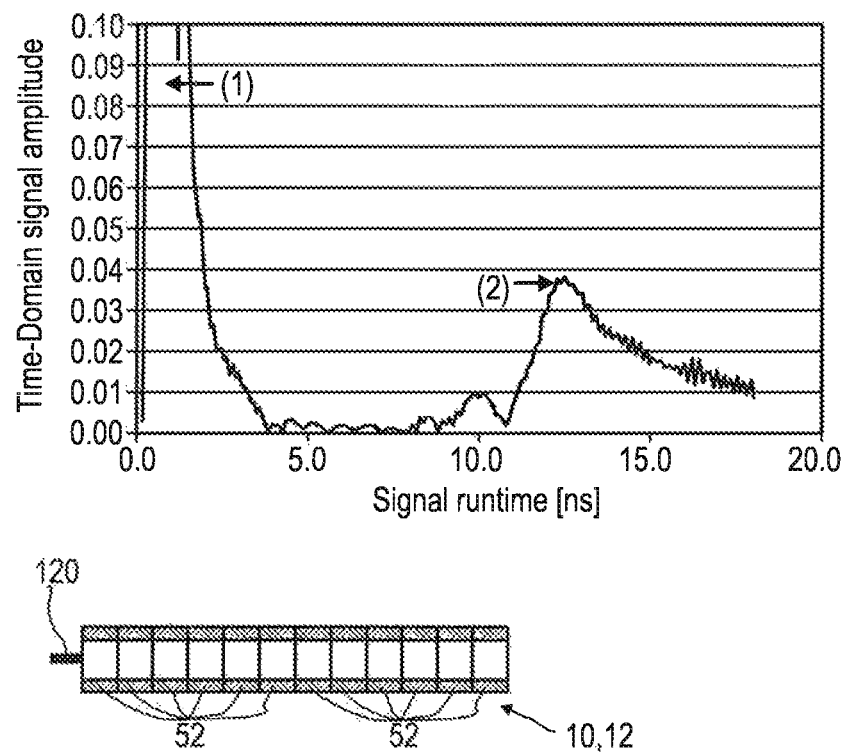
Figure 8B:
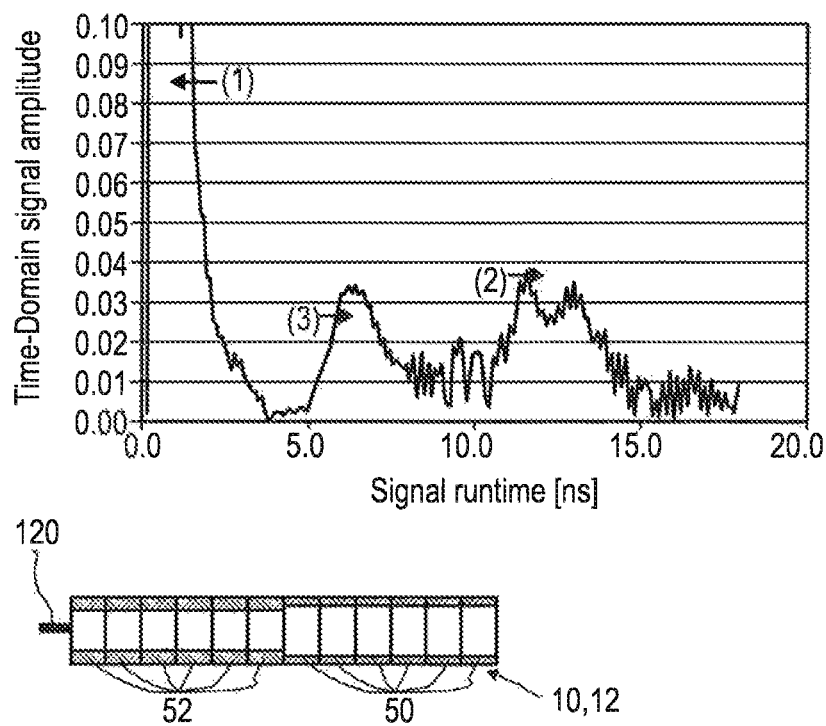
Figure 8C:
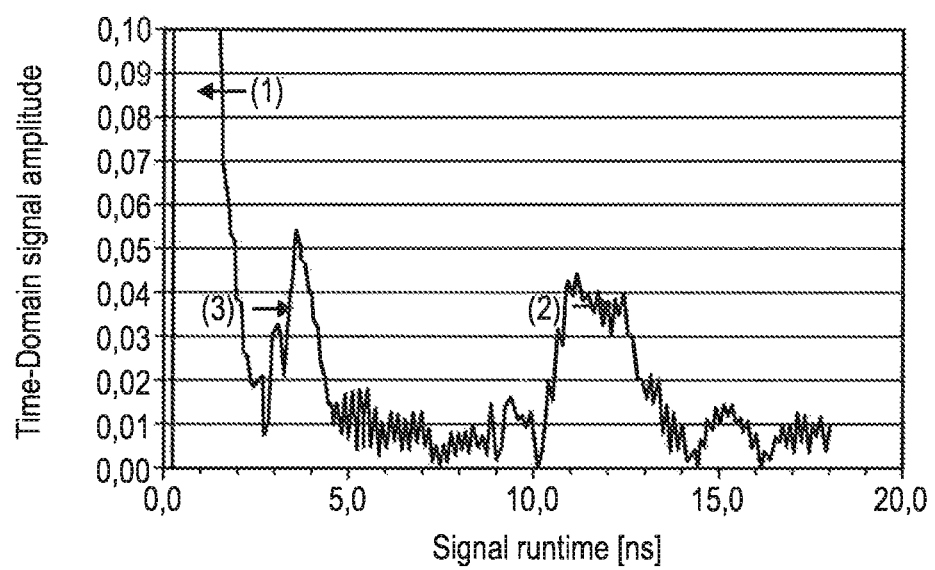
Figure 8C:
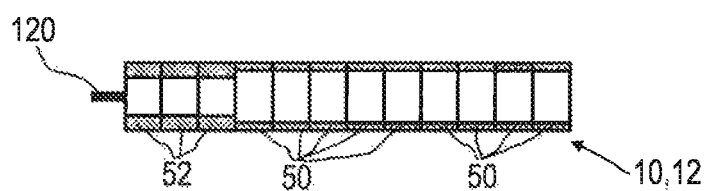
Figure 9A:
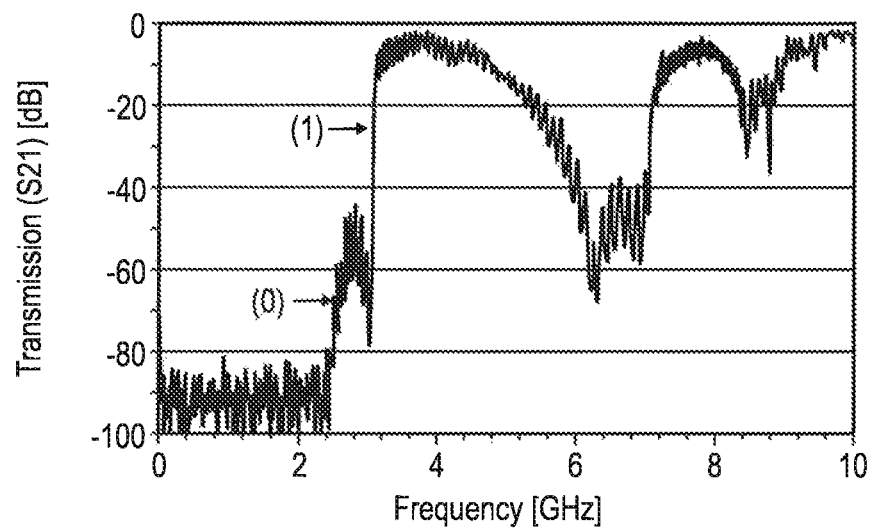
Figure 9A:
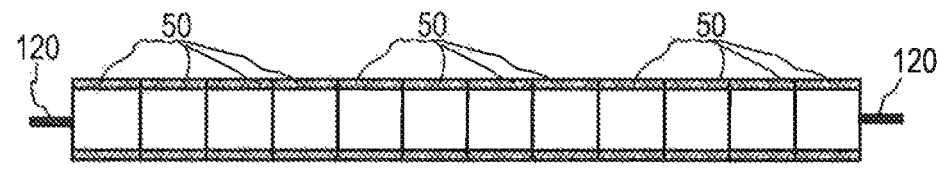
Figure 9B:
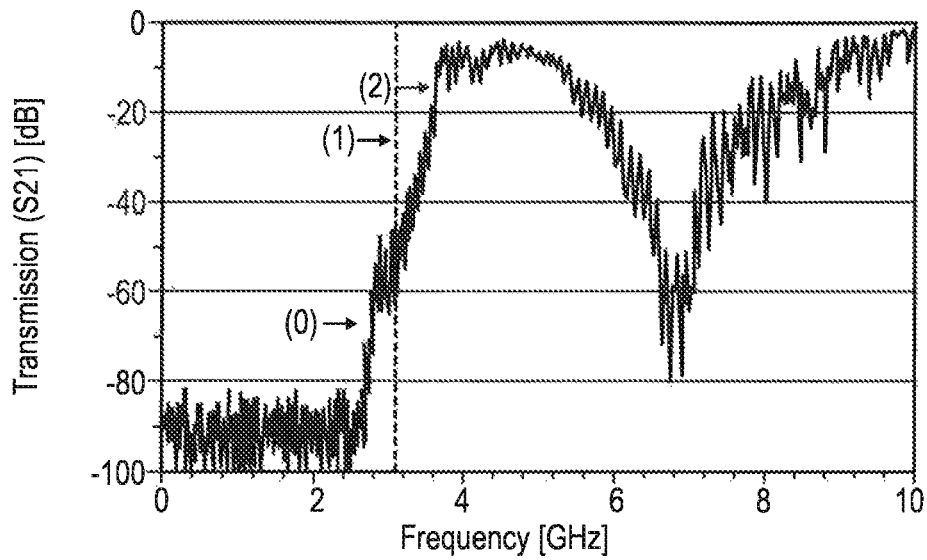
Figure 9B:
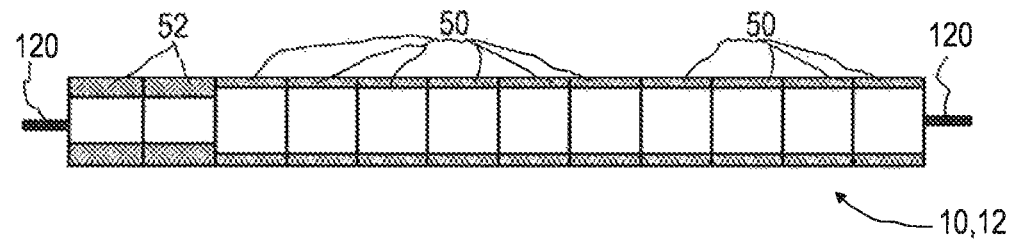
Figure 9C:
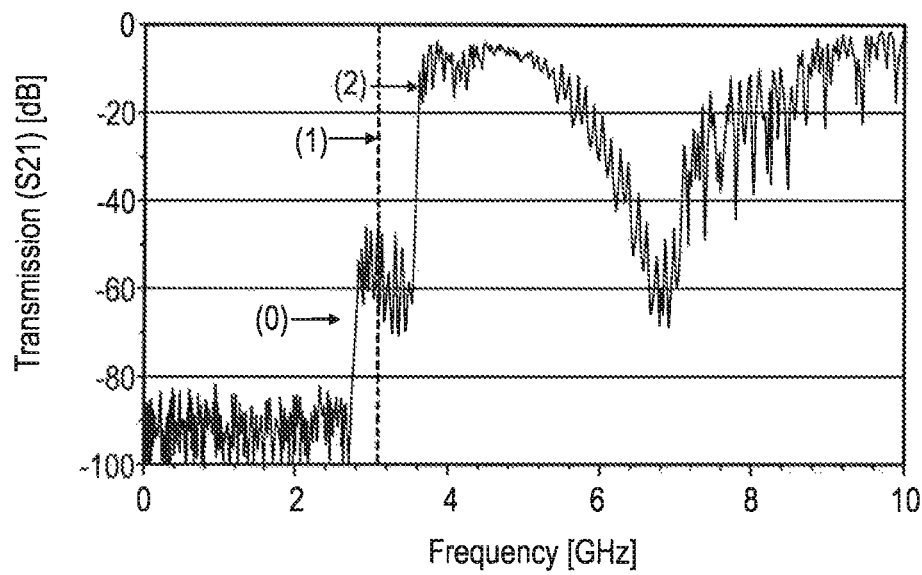
Figure 9C:
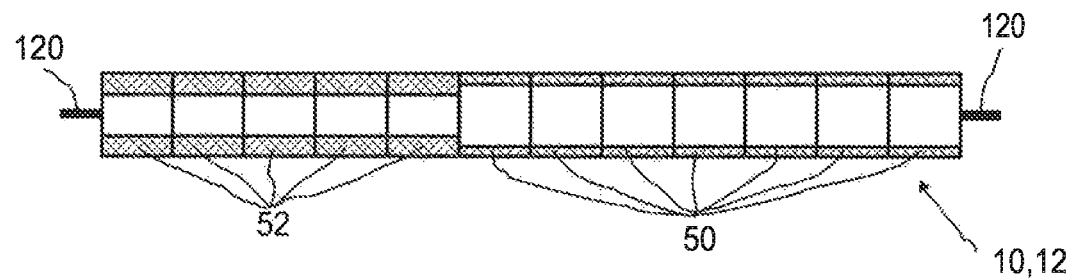
Figure 10:
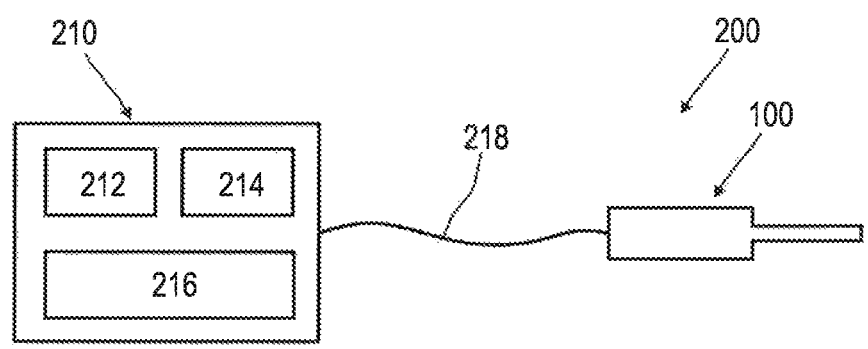

FIG. 3 shows the introduction of a microwave probe according to a first embodiment into a pipe system, FIG. 4 shows a diagrammatic representation of the tip of the microwave probe of the first embodiment, FIG. 5 shows a diagrammatic representation of the connection side of the microwave probe of the first embodiment, FIG. 6 shows a diagrammatic representation of a second embodiment of the microwave probe, FIGS. 7a to 7c show reflection measurements on a model system in the frequency domain, FIGS. 8a to 8c show reflection measurements on a model system in the time domain, FIGS. 9a to 9c show transmission measurements on a model system and FIG. 10 shows a diagrammatic representation of a measuring system.

In FIGS. 1a to 1d, various examples of configurations of pipe systems 10 are represented. The pipe systems 10 represented are part of a steam cracker. Two microwave probes 100 have been respectively introduced into the pipe systems 10 represented in FIGS. 1a to 1d. The microwave probes 100 have in this case been respectively inserted into a blind flange 15, and so at this location microwave radiation is coupled into the interior of the pipe system 10 and at this location microwave radiation is received and the pipe system 10 is closed off.

Figure 1A:
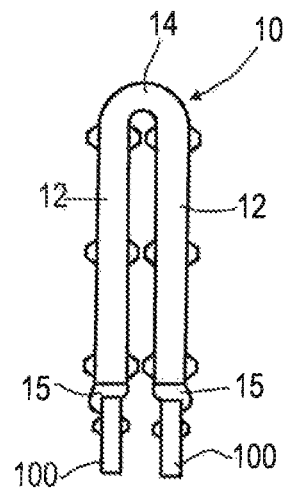
FIGS. 1a to 1d show various configurations of pipe systems.

In the first pipe system 10, represented in FIG. 1a, it comprises just two straight pipes 12, which are connected to one another at one end by way of a bend 14. The pipes 12 have an inside diameter of 3.84 cm. The two straight pipes 12 are likewise closed at their respective other end by a blind flange 15, a microwave probe 100 having been respectively introduced into the interior of the pipe system 10 by way of the blind flanges 15.

Figure 1B:
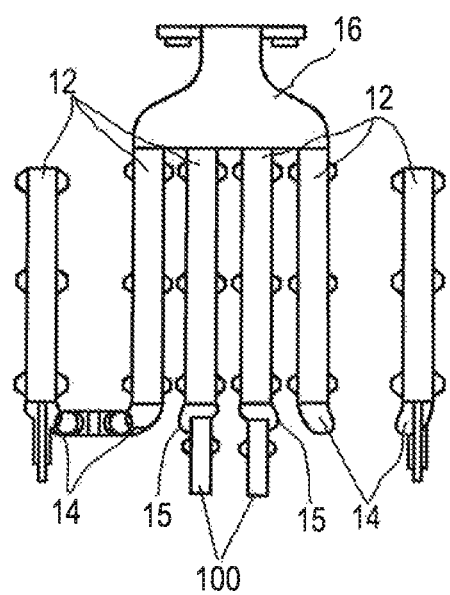

In the second pipe system 10, represented in FIG. 1b, the bend 14, which connects the two pipes 12 of FIG. 1a to one another, has been replaced by a manifold 16. The manifold 16 is additionally in connection with two further pipes 12, and so together four pipes 12 are connected to the manifold 16 and lead away in parallel from the manifold 16. The further pipes 12 are respectively adjoined by a further bend 14. As described with reference to FIG. 1a, the two middle pipes 12 are respectively closed by a blind flange 15, the two microwave probes 100 having been introduced into the pipe system 10 at the blind flanges 15. The two outer pipes 12 go over by way of their respective further bends 14 respectively into a further pipe 12, the further pipes 12 being respectively closed off by a blind flange 15.

Figure 1C:
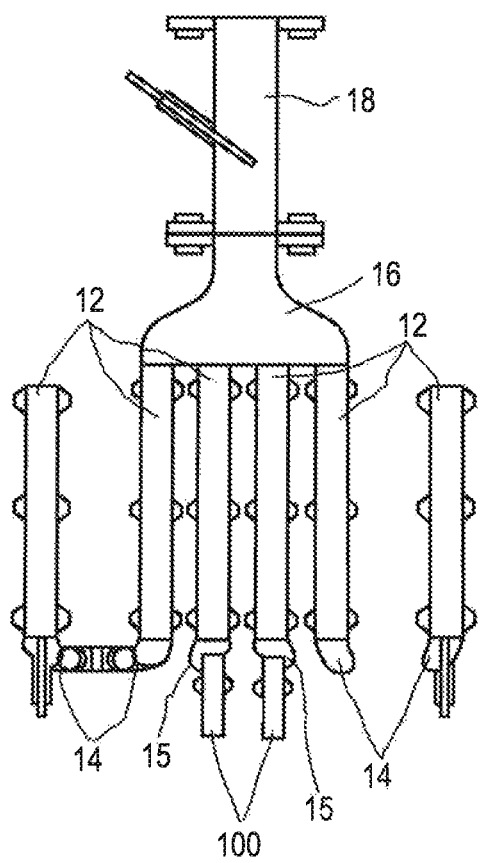

The third pipe system 10, represented in FIG. 1c, corresponds to the pipe system 10 described with reference to FIG. 1b, the manifold 16 being adjoined on the side facing away from the pipes 12 by a collecting pipe 18. The inside diameter of the collecting pipe 18 is 7.9 cm. The collecting pipe 18 has a greater diameter than the pipes 12.

Figure 1D:
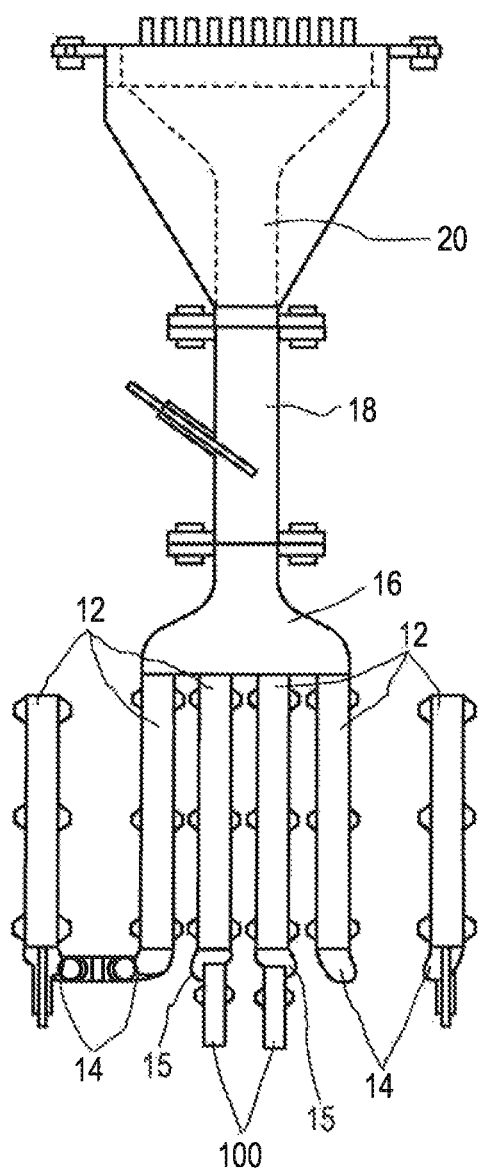

The fourth pipe system 10, represented in FIG. 1d, corresponds to the pipe system 10 described with reference to FIG. 1c, the collecting pipe 18 being adjoined by a cone 20, which opens out from the collecting pipe 18, and so the diameter widens.

Figure 2A:
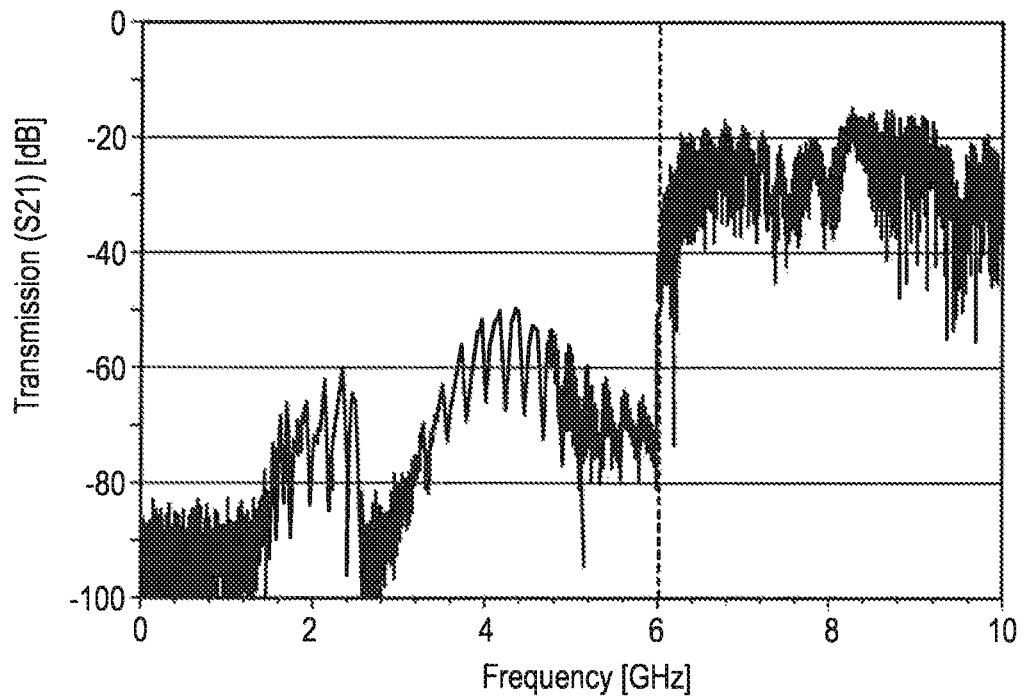
FIGS. 2a and 2b show transmission spectra for various pipe systems.
Figure 2B:
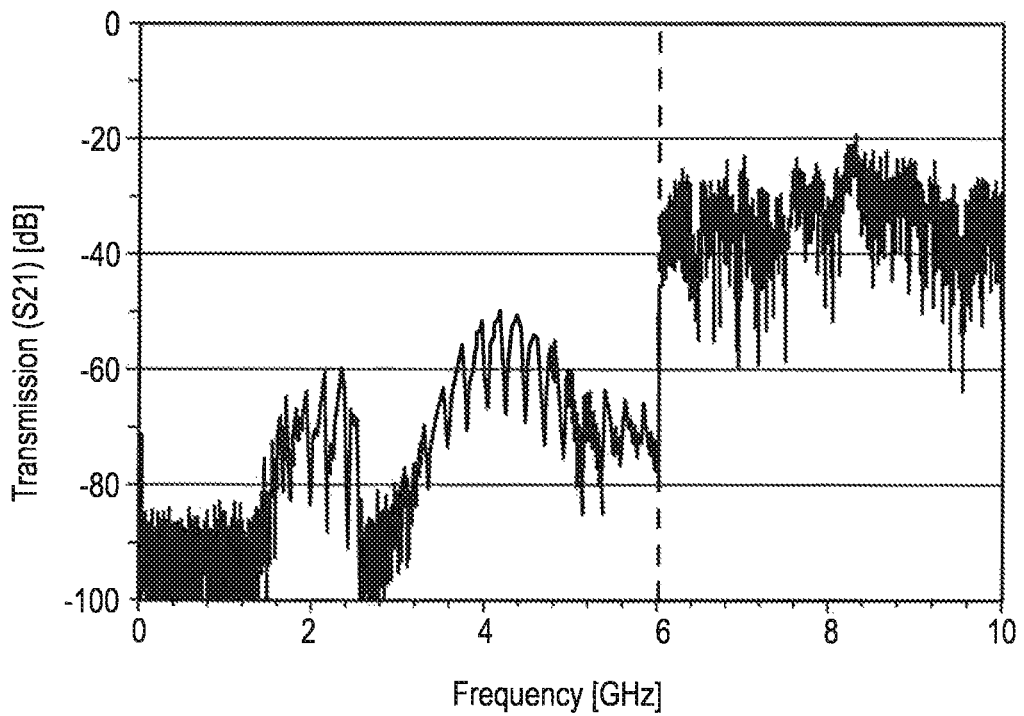

FIGS. 2a and 2b respectively show for the pipe systems 10 described with reference to FIGS. 1a and 1d a transmission spectrum. The spectra represented were obtained by a microwave signal of a signal generator being applied to one of the two microwave probes 100 such that microwaves were coupled into the pipe system 10. The microwaves propagated in the pipe system 10 in the same way as in a hollow conductor and were received again by the second microwave probe 100. The frequency of the microwave signal was varied in a range from 300 kHz to 10 GHz, the strength of the transmitted signal being plotted against the frequency in FIGS. 2a and 2b. A network analyzer Agilent E5071 C was used for carrying out the measurement. A network analyzer comprises a signal generator, an amplifier, an analog/digital converter and control equipment for carrying out the measurement.

The two spectra represented show in the frequency range of 300 kHz to 6 GHz a profile that is identical apart from minor deviations. These minor deviations are within the limits of the measuring error. In the case of the four pipe systems that are represented in FIGS. 1a to 1d, the cut-off frequency for the chosen arrangement of the microwave probes is approximately 6 GHz. For frequencies below the cut-off frequency, no microwave radiation can be coupled into the pipe system, and so the identical profile of the spectra can be expected. However, it has surprisingly been found that, even in the frequency range of 6 GHz to 10 GHz, which lies above the cut-off frequency and so microwave radiation was coupled into the respective pipe system, the spectra show qualitatively the same profile. The spectra differ only in the damping, which increases slightly with increasing size of the pipe system. The spectrum represented in FIG. 2b of the fourth and largest pipe system of FIG. 1d has greater damping in comparison with the spectrum represented in FIG. 2a of the first and smallest pipe system of FIG. 1a. The bends, branches and changes in diameter that are present in the pipe system of FIG. 1d do not change the transmitted signal, or only have the effect of a slight increase in the damping. This behavior is attributable to the fact that, even in the more complex pipe systems of FIGS. 1b, 1c and 1d, the essential part of the microwave radiation takes the direct path through the pipe system 10 between the two microwave probes 100, and so in the case of the four tested pipe systems 10 of FIGS. 1a to 1d substantially only the two pipes 12 that are directly adjacent the microwave probes 100 and the part of the bend 14 or the manifold 16 that is directly adjacent the two pipes 12 contribute to the transmitted signal that is received. Since part of the microwave radiation gets into the further pipes 12 or into the collecting pipe 18 and the cone 20 at the manifold 16 of the pipe systems 10 of FIGS. 1b, 1c and 1d, the entire signal no longer reaches the second microwave probe 100, and so the damping increases. However, the evaluability of the measurement is not impaired by this slight increase in the damping.

In a further investigation that is not represented in the figures, the microwave probes were not coupled into the pipe system 10 by way of a blind flange 15, but in each case by way of a bend 14, a bend 14 with a microwave probe 100 having respectively replaced one of the blind flanges 15 with a microwave probe 100. It has been found here that the TE11 mode with a low cut-off frequency is preferably excited here as a result of the geometrically different surrounding area of the probe.

In FIG. 3, the introduction of a microwave probe 100 according to a first embodiment into a pipe system 10 is represented. The pipe system 10 is in this case represented as a section; the microwave probe 100 is not shown in the section. The detail of the pipe system 10 that is represented shows a pipe 12, which goes over by way of a bend 14 into a flange 22. Alternatively, instead of the flange, the connection may also be realized by way of a welded connection. The flange 22 can be used to connect further parts of the pipe system 10 that are not represented in FIG. 3. Arranged at the bend 14 is a connector 24, by way of which access to the interior of the pipe system 10 is possible. By way of the connector 24, a microwave probe 100 has been introduced into the pipe system 10. Alternatively, instead of the flange, the connection may also be realized by way of a welded connection.

The microwave probe 100 comprises a casing 112, designed as a window 102, which surrounds a microwave antenna, compare FIG. 4. The window 102 protrudes by way of the connector 24 into the interior of the pipe system 10. The window 102 goes over into a protective tube 132, the part that protrudes out of the connector 24 being surrounded by a sleeve 110. The sleeve 110 is adjoined by way of a further sleeve 111 by a connection plate 116, which has a connection 118. The connection 118 can be used to apply a signal to the microwave probe 100 or the microwave antenna or to pass on received signals to an analyzer. The connection plate 116 is secured to the sleeve 110 by way of a flange 114 and a flange 142. The connection between the sleeve 110 and the connector 24 is established for example by welding.

FIG. 4 shows a diagrammatic representation of the tip of the microwave probe 100 of the first embodiment, the microwave probe 100 having been introduced into a pipe system 10. All that is represented of the pipe system 10 is a detail with a bend 14, which comprises a connector 24. The detail of the pipe system 10 is represented as a section.

The tip of the microwave probe 100 is also shown in FIG. 4 in a sectional representation. In FIG. 4, the window 102 designed as a casing 112 can be seen. The window 102 protrudes into the space inside the pipe system 10, the longitudinal axis 150 of the microwave probe 100 being perpendicular to a direction of flow 26, and so approximately half the surface of the window 102 is directly subjected to the flow.

Inside the casing 112 there is a microwave antenna 120, which in the embodiment represented in FIG. 4 is designed as a pin antenna. Seen in the longitudinal direction, the tip of the microwave antenna 120 is at a distance from the casing 112. The distance is at least 20 mm.

The microwave antenna 120 is connected to a coaxial cable 124, an end cap 122 being arranged on the coaxial cable 124 at the connecting point. The coaxial cable 124 is guided in the casing 112 in a centered manner by way of a holding plate 128. The holding plate 128 is held on a number of rods 126, for example three, with two rods 126 being visible in the sectional representation of FIG. 4. Optionally, further holding plates 128 for guiding the coaxial cable 124 may be arranged on the rods 126.

At the connector 24, the microwave probe 100 or its casing 112 has been introduced into the interior of the pipe system 10, a sliding bearing 130 being arranged in the connector 24. This primarily brings about a centering of the casing 112 to suppress disadvantageous vibrations. On account of the coke formation, it can also be assumed that the narrow annular gap of the sliding bearing 130 very quickly closes, and consequently seals off the gas path between the connector 24 and the casing 112, and so as little condensable fluid as possible that is flowing in the space inside the pipe system 10 can reach the outside. At the same time, the sliding bearing 130 allows a movement of the microwave probe 100 along its longitudinal axis 150.

FIG. 5 shows a diagrammatic representation of the connection side of the microwave probe 100 of the first embodiment.

The connection side is opposite from the side on which the microwave antenna 120 is arranged and has a connection plate 116. The coaxial cable 124 is guided through the connection plate 116 to a connection 118. The connection 118 is for example a connector used in radio frequency technology, such as for example an SMA connector, an APC7 connector or an N connector. The connection plate 116 goes over in the direction of the microwave antenna 120 into a further sleeve 111. Inside the further sleeve 111 there is a length-compensating element 138, which on one side is welded to the sleeve 111 and on its other side goes over into the protective tube 132. For this purpose, secured to the sleeve 111 is a ring 137, which is connected to a connection piece 139 of the length-compensating element 138.

The further sleeve 111 ends in a flange 114. The flange 114 and the flange 142 arranged on the sleeve 110 are used to connect the sleeve 110 and the further sleeve 111 to one another, a seal 140 having been inserted between the flange 114 and the flange 142. A number of bolts 115 are used for the connection of the flanges 114 and 142.

At the transition between the protective tube 132 and the length-compensating element 138, a connecting pipe 134 is secured on the protective tube 132 and a ring 136 is arranged on the length-compensating element 138. The connecting pipe 134 and the ring 136 are connected to one another by welding. Correspondingly, at the transition between the length-compensating element 138 and the connection plate 116, arranged on the length-compensating element 138 there is a connecting pipe, which is secured by welding on a ring 137, which in turn is secured on the sleeve 110 by welding.

In FIG. 6, a second embodiment of a microwave probe 100 is diagrammatically represented. FIG. 6 shows the microwave probe 100 and a detail of the pipe system 10 in a sectional representation. All that is represented of the pipe system 10 is a bend 14, the ends of which are adjoined by further parts of the pipe system 10 that are not represented.

The microwave probe 100 has a sleeve 110, which on one side comprises an opening for the connection to the pipe system 10 and on its other, opposite side is closed by a terminal plate 152. Guided through the terminal plate 152 is a microwave antenna 120, which is designed as a pin antenna and is surrounded by a casing 112. The casing 112 and the microwave antenna 120 are arranged concentrically in relation to the sleeve 110 and protrude into the interior of the sleeve 110, but not into the pipe system 10.

The casing 112 is adjoined on the outer side of the terminal plate 152 by a connection plate 116, which is secured by way of a number of bolts 115 on the terminal plate 152 and comprises a connection 118. Guided through the connection plate 116 is a coaxial cable 124, which is closed off by an end cap 122 and goes over into the microwave antenna 120. The coaxial cable 124 is connected to the connection 118 and makes it possible for a signal to be applied to the microwave antenna 120 and, conversely, for a signal that is received by the microwave antenna 120 to be passed on to an analyzer.

The space inside the sleeve 110 that is not filled by the casing 112 is taken up by a displacer 146, which in the direction of the pipe system 10 is provided with a cap 144. The displacer 146 and the cap 144 are both respectively composed of materials that are transparent to microwave radiation and together form the window 102. The casing 112 is also composed of materials that are transparent to microwaves. The cap 144 is conically formed, the tip of the cone form that is thus formed lying on the longitudinal axis 152 of the microwave probe 100. Alternatively, the cap 144 may also be designed as a wedge, the wedge being arranged such that the fluid flows against the sloping surface that is formed by the wedge form.

The sleeve 110 has on the side facing the pipe system 10 a flange 142. Arranged at the bend 14 of the pipe system 10 is a flange 22, and so the flanges 142 and 22 can be used to connect the microwave probe 100 to the pipe system 10. Alternatively, the sleeve 110 may be connected to the pipe system 10 by means of welding.

Like the pipe system 10, the sleeve 110 is produced from an electrically conductive material, and so both the pipe system 10 and the sleeve 110 are suitable as hollow conductors for microwaves. The inside diameter of the sleeve 110 corresponds to the inside diameter of the pipe system 10.

After the connecting, the microwave probe 100 is arranged in such a way that a flow 26 of a fluid, conducted in the pipe system 10, flows against the conical window 102 perpendicularly to the longitudinal axis 152 of the microwave probe 100.

FIGS. 7a to 7c show reflection measurements on a model system in the frequency domain. The model system consists of a pipe 12 with an inside diameter of 107.1 mm and a length of 1071 mm. The diameter-to-length ratio of 1:10 was chosen such that the measurement result is no longer dependent on the length of the pipe 12, that is to say the results obtained also apply to longer pipes. Graphite inserts 50, 52 were inserted into the pipe in order to simulate carbonaceous deposits. Each insert has a length of 89 mm, and so 12 inserts were fitted in the pipe. Inserts with two different inside diameters were used in the tests, the outside diameter being respectively 106.85 mm. In the case of the large inserts 52, the inside diameter was 64.11 mm; in case of the small inserts 50, the inside diameter was 74.8 mm.

At the end of the pipe 12, a microwave antenna 120 in the form of a pin antenna was inserted into the pipe 12, the pin antenna having been arranged concentrically in the pipe 12. For carrying out the measurements, reflection spectra in the range of 300 kHz to 10 GHz were recorded with a network analyzer of the type Agilent E5071 C. In this case, for each measured frequency a time-limited microwave signal with this frequency was emitted and subsequently received again by way of the same microwave antenna 120.

In the test represented in FIG. 7a, the pipe 12 is completely loaded with small inserts 50. At the position denoted by (1), the cut-off frequency of the pipe 12 with the small inserts 50 can be seen in the spectrum at approximately 3.2 GHz. The dashed line depicted in FIGS. 7a to 7c characterizes the cut-off frequency of the pipe system 12 with the small inserts 50.

In the test represented in FIG. 7b, the two small inserts 50 placed closest to the microwave antenna 120 were replaced by large inserts 52 and a further reflection spectrum was measured. As can be seen from the representation of the spectrum in FIG. 7b, the constriction caused by the large inserts 52 has the effect that the cut-off frequency is shifted to higher frequencies. This shift indicates a constriction. The cut-off frequency is shifted to approximately 3.7 GHz, which corresponds to the change that is expected for the change in diameter.

In the test represented in FIG. 7c, the five small inserts 52 placed closest to the microwave antenna 120 were replaced by large inserts 52 and a further reflection spectrum was measured. As can be seen from the representation of the spectrum in FIG. 7c, there is no further change in the cut-off frequency as compared with the measurement represented with reference to FIG. 7b. Nor is a further change to be expected, since the cut-off frequency is given by the smallest free pipe cross-section.

FIGS. 8a to 8c show reflection measurements on a model system in the time domain. The model system consists of a pipe 12 with an inside diameter of 107.1 mm and a length of 1071 mm. The diameter-to-length ratio of 1:10 was chosen such that the measurement result is no longer dependent on the length of the pipe 12, that is to say the results obtained also apply to longer pipes. Graphite inserts were inserted into the pipe 12 in order to simulate carbonaceous deposits. Each insert has a length of 89 mm, and so 12 inserts were fitted in the pipe. Inserts with two different inside diameters were used in the tests, the outside diameter being respectively 106.85 mm. In the case of the large inserts 52, the inside diameter was 64.11 mm; in case of the small inserts 50, the inside diameter was 74.8 mm.

At the end of the pipe 12, a microwave antenna 120 in the form of a pin antenna was inserted into the pipe 12. For carrying out the measurements, reflection spectra were recorded with a network analyzer of the type Agilent E5071 C for microwave pulses, which were coupled into the pipe by the microwave antenna 120 and the reflections of which were subsequently received again by the same microwave antenna. In FIGS. 8a to 8c, the signal amplitude in arbitrary units is respectively plotted against the signal runtime in ns.

In the case of the measurement represented in FIG. 8a, the pipe 12 was loaded completely with large inserts 52. In the measuring curve represented there are two maxima. A first maximum, which is marked by (1), is attributable to the reflection at the transition from the antenna to the pipe. This indicates a direct reflection of the microwaves in the region of the microwave antenna 120. A second maximum, which is marked by (2), is produced by the reflection of the microwaves at the open end of the pipe 12.

In the case of the measurement represented in FIG. 8b, the pipe 12 was half-loaded with large inserts 52. The side of the pipe 12 facing away from the microwave antenna 120 was loaded with small inserts 50. In the measuring curve represented, there are three maxima. As described with reference to FIG. 8a, the maxima marked by (1) and (2) correspond to the direct reflection from the coupling in at the microwave antenna 120 and the reflection at the open end of the pipe 12. The third maximum, marked by (3), corresponds to the reflection at the transition from the large inserts 52 to the small inserts 50. The signal runtime allows the position of this transition in the pipe 12 to be localized, and here it lies precisely in the middle of the pipe 12.

In the case of the measurement represented in FIG. 8c, a quarter of the pipe 12 was loaded with large inserts 52. The side of the pipe 12 facing away from the microwave antenna 120 was loaded with small inserts 50. As described with reference to FIG. 8b, a measuring curve with three maxima is obtained, the position of the third maximum (3), which corresponds to the reflection at the transition point from the large inserts 52 to the small inserts 50, having been shifted. The shift corresponds exactly to the changed distance of the transition from the microwave antenna 120.

In FIGS. 9a to 9c, transmission measurements on a model system in the frequency domain are represented. As described with reference to FIGS. 7 and 8, the model system consists of a pipe 12 with an inside diameter of 107.1 mm and a length of 1071 mm. The diameter-to-length ratio of 1:10 was chosen such that the measurement result is no longer dependent on the length of the pipe 12, that is to say the results obtained also apply to longer pipes. Graphite inserts were inserted into the pipe 12 in order to simulate carbonaceous deposits. Each insert has a length of 89 mm, and so 12 inserts were fitted in the pipe. Inserts with two different inside diameters were used in the tests, the outside diameter being respectively 106.85 mm. In the case of the large inserts 52, the inside diameter was 64.11 mm; in case of the small inserts 50, the inside diameter was 74.8 mm.

At both ends of the pipe 12, a microwave antenna 120 in the form of a pin antenna was respectively inserted into the pipe 12. For carrying out the measurements, transmission spectra were recorded in the range of 300 kHz to 10 GHz with a network analyzer of the type Agilent E5071 C. For each measured frequency, a microwave signal with this frequency was emitted by a microwave antenna and subsequently received again by the other microwave antenna 120.

In the measurement of FIG. 9a, twelve small inserts 50 have been inserted into the pipe 12. In the transmission spectrum represented, two cut-off frequencies can be seen, respectively marked by (0) and (1). The position (0) marks the cut-off frequency of the TE11 oscillation mode and the position (1) marks the cut-off frequency of the TM01 oscillation mode. It can be clearly seen that the amplitude of the TM01 oscillation mode is significantly greater than that of the TE11 oscillation mode. The reason for this is that, as a result of the chosen arrangement of the microwave antenna, the TE11 oscillation mode can only be weakly excited.

In the measurement of FIG. 9b, two small inserts 50 directly adjacent the microwave antennas 120 were replaced by large inserts 52. It can be seen in the transmission spectrum represented that the cut-off frequencies have shifted. The shifted cut-off frequency of the TM01 oscillation mode has been marked by (2).

In the test represented in FIG. 9c, the five small inserts 50 placed closest to the left-hand microwave antenna 120 were replaced by large inserts 52 and a further transmission spectrum was measured. It can be seen in the transmission spectrum represented that the cut-off frequencies have not been shifted any further, just that the sharpness of the transition, that is to say the rise in the spectrum, has increased.

In FIG. 10, a measuring system 200 is diagrammatically represented.

The measuring system 200 comprises a network analyzer, which in turn comprises a microwave generator 212, a microwave receiver 214 and an analyzer 216. The microwave generator 212 serves as a signal generator and generates microwave signals with a desired amplitude and frequency. The microwave receiver 214 comprises filters and preamplifiers and also an analog/digital converter. The microwave receiver 214 prepares received signals for later electronic further processing. This further processing is carried out by the analyzer 216, which also controls the sequence of the measurement.

The network analyzer 210 is connected by way of a cable 218 to a microwave probe 100, which for carrying out the proposed measuring method has been introduced into a pipe system of an apparatus. In further embodiments, the system comprises a number of microwave probes 100, for example two microwave probes 100. If at least two microwave probes 100 are used, in addition to reflection measurements, for which a single microwave probe 100 is sufficient, transmission measurements can also be carried out.

LIST OF DESIGNATIONS

10 pipe system
12 pipe
14 bend
15 blind flange
16 collecting pipe
18 pipe of large diameter
20 cone
22 flange (pipe system)
24 access connector
26 flow
50 thin-walled graphite insert
52 thick-walled graphite insert
100 microwave probe 102 window
110 sleeve
111 sleeve
112 casing
114 flange
115 bolt
116 connection plate
118 connection
120 antenna
122 end cap
124 coaxial cable
126 rod
128 holding plate
130 sliding bearing
132 protective tube
134 connecting pipe
136 ring
137 ring
138 length-compensating element
139 connection piece
140 seal
142 flange
144 cap
146 displacer
150 longitudinal axis
152 terminal plate
200 measuring system
210 network analyzer
212 microwave generator
214 microwave reception
216 analyzer
218 cable

The invention claimed is:

1. A method for detecting deposits in a pipe system of an apparatus that is flowed through by a fluid,
wherein at least one microwave probe is introduced into the pipe system in such a way that the fluid flows against a window of the microwave probe that is transparent to microwave radiation, and wherein microwaves are coupled into the pipe system by way of at least one microwave probe through the window which is transparent to microwave radiation, wherein the microwaves coupled into the pipe system propagate in the pipe system in the same way as in a hollow conductor,
wherein
a.) a reflection measurement is carried out, in which reflections of the microwaves radiated by the at least one microwave probe are received again by the respective microwave probe, cut-off frequencies being determined, wherein for determining the cut-off frequencies of the microwaves coupled into the pipe system, the frequency of the microwaves is varied in a preset region and for each frequency the intensity of the reflected microwave radiation is determined, and a comparison with a reference or a previous measurement being used to deduce a constriction in the surrounding area of the microwave probe, wherein cut-off frequencies indicating constrictions are detected and the free cross-section at the constriction being determined from this constriction indicating cut-off frequency, and/or
b.) a reflection measurement is carried out, in which reflections of the microwaves radiated by the at least one microwave probe are received again by the respective microwave probe at a constriction, the distance between the respective microwave probe and the constriction in the pipe system being ascertained by taking account of a signal runtime, and/or
c.) at least two microwave probes are introduced into the pipe system at a distance from one another and a transmission measurement between two microwave probes is carried out, the arrangement of the two microwave probes defining a pipe system segment, cut-off frequencies of the pipe system segment being determined, wherein for determining the cut-off frequencies of the microwaves coupled into the pipe system, the frequency of the microwaves is varied in a preset region and for each frequency the intensity of the reflected microwave radiation is determined, and a comparison with a reference or a previous measurement being used to deduce a constriction in the pipe system segment, wherein cut-off frequencies indicating constrictions are detected and the free cross-section at the constriction being determined from this constriction indicating cut-off frequency,
wherein the detection of a constriction is used to deduce the presence of deposits.

2. The method according to claim 1, wherein the pipe system comprises at least one region of changed cross-section, a branch and/or a curve.

3. The method according to claim 1, wherein, for determining the signal runtime of a microwave signal according to variant b), either a time-limited microwave pulse is coupled into the pipe system or a continuous monochromatic microwave signal is coupled in, and so a microwave resonance field is generated, the microwave probe being used to determine the amplitude and phase of the resonance field, the frequency of the signal is varied and the response of the pipe system is calculated by means of an inverse Fourier transform for a time-limited microwave pulse.

4. The method according to claim 1, wherein two microwave probes are introduced into the pipe system at a distance from one another and the reflection measurement according to variant b) is carried out from two sides of a pipe system segment defined by the microwave probes, the ascertained distances of a constriction from the two microwave probes and the known length of the pipe system segment being used to determine the length of the constriction or the distance between two constrictions.

5. The method according to claim 1, wherein, in the case of the transmission measurement according to variant c), the amplitude is additionally measured, a change in the amplitude indicating a narrowing.

6. The method according to claim 1, the measurements being carried out continuously during the operation of the apparatus and a change over time in the measured parameters being determined, wherein the operating conditions of the apparatus are varied, a speeding up of the change over time being taken to mean unfavorable operating conditions and a slowing down of the change over time being taken to mean favorable operating conditions.

7. The method according to claim 1, wherein reference values for the pipe system of the apparatus are determined on a model, the reference values are scaled up to the size of the apparatus and, when carrying out a measurement, the measurement results are compared with the reference values wherein the model is a computer model or a reduced scale model of the pipe system.

8. The method according to claim 1, wherein a shielding is arranged at connecting points of the pipe system.

9. The method according to claim 1, wherein the pipe system has a curved section, wherein the at least one microwave probe is introduced into the pipe system at the curved section.

10. A microwave probe for coupling microwaves into a pipe system of an apparatus, wherein the microwaves coupled into the pipe system propagate in the pipe system in the same way as in a hollow conductor, comprising:
   a microwave antenna,
   a window of a material that is transparent to microwave radiation,
   a coaxial cable that is connected to the microwave antenna and
   a sleeve,
wherein the microwave probe is designed for use in the method according to claim 1, wherein
   a. the microwave antenna consists of a temperature-resistant metal alloy, the coaxial cable comprises a temperature-resistant metal alloy and an inorganic dielectric and the window is designed as a casing that surrounds the microwave antenna, wherein the sleeve is configured such that the sleeve adjoins the pipe system on the outside and wherein the window designed as a casing goes over on the side facing the coaxial cable into a protective tube, which is connected to the sleeve by way of a length-compensating element, the sleeve at least partially surrounding the protective tube, or
   b. the sleeve consists of an electrically conductive material and is configured as a hollow conductor, the inside diameter of the sleeve corresponding to the inside diameter of the pipe system, the sleeve having on a first side an opening for connecting to the pipe system, the microwave antenna, which is covered by a casing transparent to microwave radiation and extends into the interior of the sleeve, being arranged on the second, opposite side, and the window being designed as a displacer which is of a material that is temperature-resistant and transparent to microwave radiation and takes up the remaining space inside the sleeve.

11. The microwave probe according to claim 10, wherein the side of the window that is facing the opening and is designed as a displacer has a conical form or the form of a wedge.

12. The microwave probe according to claim 10, wherein the displacer comprises on the side facing the opening a cap of a material that is abrasion-resistant and transparent to microwave radiation.

13. The microwave probe according to claim 10, wherein a distance between the tip of the microwave antenna and the casing, seen in the direction of the longitudinal axis of the antenna, is at least 20 mm.

14. The microwave probe according to claim 10, wherein the region between the microwave antenna and the casing surrounding it is filled with an inert gas.

15. A measuring system for detecting deposits in a pipe system (10) of an apparatus comprising:
   at least one microwave probe according to claim 10,
   at least one microwave generator and
   at least one microwave receiver,
the measuring system being designed to carry out the method according to a method for detecting deposits in a pipe system of an apparatus that is flowed through by a fluid, wherein at least one microwave probe is introduced into the pipe system in such a way that the fluid flows against a window of the microwave probe that is transparent to microwave radiation, and wherein microwaves are coupled into the pipe system by way of at least one microwave probe through the window which is transparent to microwave radiation, wherein the microwaves coupled into the pipe system propagate in the pipe system in the same way as in a hollow conductor,
wherein
   a.) a reflection measurement is carried out, in which reflections of the microwaves radiated by the at least one microwave probe-are received again by the respective microwave probe, cut-off frequencies being determined, wherein for determining the cut-off frequencies of the microwaves coupled into the pipe system, the frequency of the microwaves is varied in a preset region and for each frequency the intensity of the reflected microwave radiation is determined, and a comparison with a reference or a previous measurement being used to deduce a constriction in the surrounding area of the microwave probe, wherein cut-off frequencies indicating constrictions are detected and the free cross-section at the constriction being determined from this constriction indicating cut-off frequency, and/or
   b.) a reflection measurement is carried out, in which reflections of the microwaves radiated by the at least one microwave probe are received again by the respective microwave probe at a constriction, the distance between the respective microwave probe and the constriction in the pipe system being ascertained by taking account of a signal runtime, and/or
   c.) at least two microwave probes are introduced into the pipe system at a distance from one another and a transmission measurement between two microwave probes is carried out, the arrangement of the two microwave probes defining a pipe system segment, cut-off frequencies of the pipe system segment being determined, wherein for determining the cut-off frequencies of the microwaves coupled into the pipe system, the frequency of the microwaves is varied in a preset region and for each frequency the intensity of the reflected microwave radiation is determined, and a comparison with a reference or a previous measurement being used to deduce a constriction in the pipe system segment, wherein cut-off frequencies indicating constrictions are detected and the free cross-section at the constriction being determined from this constriction indicating cut-off frequency,
wherein the detection of a constriction is used to deduce the presence of deposits.

* * * * *